(12) United States Patent
Fu et al.

(10) Patent No.: US 11,743,017 B2
(45) Date of Patent: Aug. 29, 2023

(54) APPARATUS AND METHOD FOR DETECTING CONTROL CHANNEL IN WIRELESS COMMUNICATION SYSTEM

(71) Applicant: Samsung Electronics Co., Ltd., Suwon-si (KR)

(72) Inventors: Jingxing Fu, Beijing (CN); Bin Yu, Beijing (CN); Chen Qian, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 279 days.

(21) Appl. No.: 17/255,637

(22) PCT Filed: Jul. 4, 2019

(86) PCT No.: PCT/KR2019/008165
§ 371 (c)(1),
(2) Date: Dec. 23, 2020

(87) PCT Pub. No.: WO2020/009480
PCT Pub. Date: Jan. 9, 2020

(65) Prior Publication Data
US 2021/0266135 A1    Aug. 26, 2021

(30) Foreign Application Priority Data

Jul. 4, 2018 (CN) .......................... 201810727990.7
Sep. 14, 2018 (CN) .......................... 201811078414.0
Oct. 12, 2018 (CN) .......................... 201811193609.X

(51) Int. Cl.
*H04L 5/00* (2006.01)
*H04L 1/00* (2006.01)
(Continued)

(52) U.S. Cl.
CPC .......... *H04L 5/0098* (2013.01); *H04L 1/0025* (2013.01); *H04L 5/0092* (2013.01);
(Continued)

(58) Field of Classification Search
CPC ... H04L 5/0098; H04L 1/0025; H04L 5/0092; H04L 5/0023; H04L 5/0035;
(Continued)

(56) References Cited

U.S. PATENT DOCUMENTS 10,448,389 B1 * 10/2019 Seo .................. H04L 5/0053
2009/0080372 A1 * 3/2009 Naka .................. H04B 1/7083
370/328

(Continued)

FOREIGN PATENT DOCUMENTS

WO    2018/066923 A1    4/2018

OTHER PUBLICATIONS

Intel Corporation, "Remaining details on CORESET and search space", 3GPP Draft, R1-1806550, 3rd Eneration Partnership Project (3GPP), vol. RAN WG1, Busan, Korea, May 21, 2018-May 25, 2018, May 20, 2018 (Year: 2018).*

(Continued)

*Primary Examiner* — Ivan O Latorre
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). The present disclosure provides a method for downlink reception, width Part 'BWP' to which switching is made; and performing downlink reception according to the determined downlink receiving state on the active downlink BWP to which switching is made. The present disclosure also pro-
(Continued)

vides a method for performing PDCCH detection, and a corresponding UE and a computer readable medium.

8 Claims, 7 Drawing Sheets

(51) Int. Cl.
  *H04W 52/02* (2009.01)
  *H04W 72/0453* (2023.01)
  *H04W 74/08* (2009.01)
  *H04W 72/23* (2023.01)

(52) U.S. Cl.
  CPC ... *H04W 52/0229* (2013.01); *H04W 72/0453* (2013.01); *H04W 72/23* (2023.01); *H04W 74/0816* (2013.01)

(58) Field of Classification Search
  CPC . H04L 27/26025; H04L 5/001; H04L 5/0064; H04L 5/0053; H04L 1/0036; H04W 52/0229; H04W 72/042; H04W 72/0453; H04W 74/0816; H04W 72/23; H04W 74/0808
  See application file for complete search history.

(56) References Cited

U.S. PATENT DOCUMENTS

| | | | | |
|---|---|---|---|---|
| 2009/0257427 | A1* | 10/2009 | Shitara | H04L 5/005 370/350 |
| 2012/0134332 | A1* | 5/2012 | Lin | H04B 7/0678 370/329 |
| 2015/0365925 | A1* | 12/2015 | Fu | H04L 5/0048 370/329 |
| 2016/0044706 | A1* | 2/2016 | Yang | H04W 72/1268 370/329 |
| 2016/0205614 | A1* | 7/2016 | Ma | H04L 5/005 370/329 |
| 2016/0337874 | A1* | 11/2016 | Yang | H04W 72/0453 |
| 2018/0007574 | A1* | 1/2018 | Park | H04L 5/0048 |
| 2018/0183551 | A1 | 6/2018 | Chou et al. | |
| 2021/0250916 | A1* | 8/2021 | Mu | H04W 4/70 |

OTHER PUBLICATIONS

Intel Corporation, "Remaining details on CORESET and search space", 3GPP Draft, R1-1806550, 3rd Generation Partnership Project (3GPP), vol. RAAN WG1, Busan, Korea, May 21, 2018-May 25, 2018, May 20, 2018, XP051441752.

Interdigital Inc, "BWP operation in unlicensed spectrum", 3GPP Draft, R1-1806968 (R15 NR WI AI 7645—BWP for NR-U), 3rd Generation Partnership Project (3GPP), vol. RAN WG1, Busan, Korea, May 21, 2018-May 25, 2018, May 20, 2018, XP051442167.

Extended European Search Report dated Oct. 11, 2021, issued in European Patent Application No. 19829904.2.

Vivo, "Potential solutions and techniques for NR unlicensed spectrum", 3GPP Draft, R1-1801557, vol. RAN WG1, Athens, Greece, Feb. 26, 2018-Mar. 2, 2018, Feb. 15, 2018, XP051396809.

Panasonic, "Interaction between BWP operation and C-DRX", 3GPP Draft, R2-1803182, vol. RAN WG2, Athens, Greece, Feb. 26, 2018-Mar. 2, 2018, Feb. 15, 2018, XP051399709.

Huawei et al., "Design considerations for UE power saving", 3GPP Draft; R1-1807306, vol. RAN WG1, Busan, Korea, May 21, 2018-May 25, 2018, May 20, 2018, XP051442501.

Samsung, "On timing between DCI indicating active BWP switching and active BWP switching", 3GPP Draft, R1-1720338, vol. RAN WG1, Reno, USA, Nov. 27, 2017-Dec. 1, 2017, Nov. 18, 2017, XP051369924.

Partial Supplementary European Search Report dated Jun. 23, 2021, issued in European Patent Application No. 19829904.2.

Intel Corporation, on BWP switching, 3GPP TSG-RAN4 Meeting #87, R4-1807935, May 31, 2018, Busan, South Korea.

Apple Inc., Enhancements for NR UE Power Saving, 3GPP TSG-RAN WG1 Meeting #93, R1-1807005, May 12, 2018, Busan, South Korea.

OPPO, Considerations on NR power saving, 3GPP TSG RAN Meeting #80, RP-180834, Jun. 4, 2018, La Jolla, USA.

* cited by examiner

[Fig. 1]
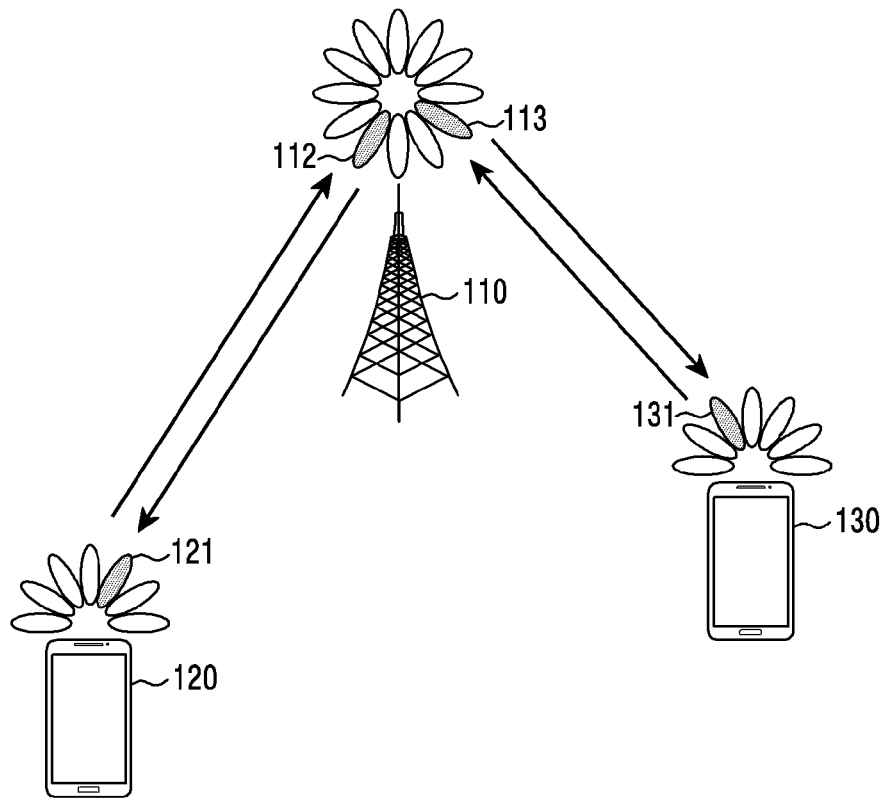
[Fig. 2]
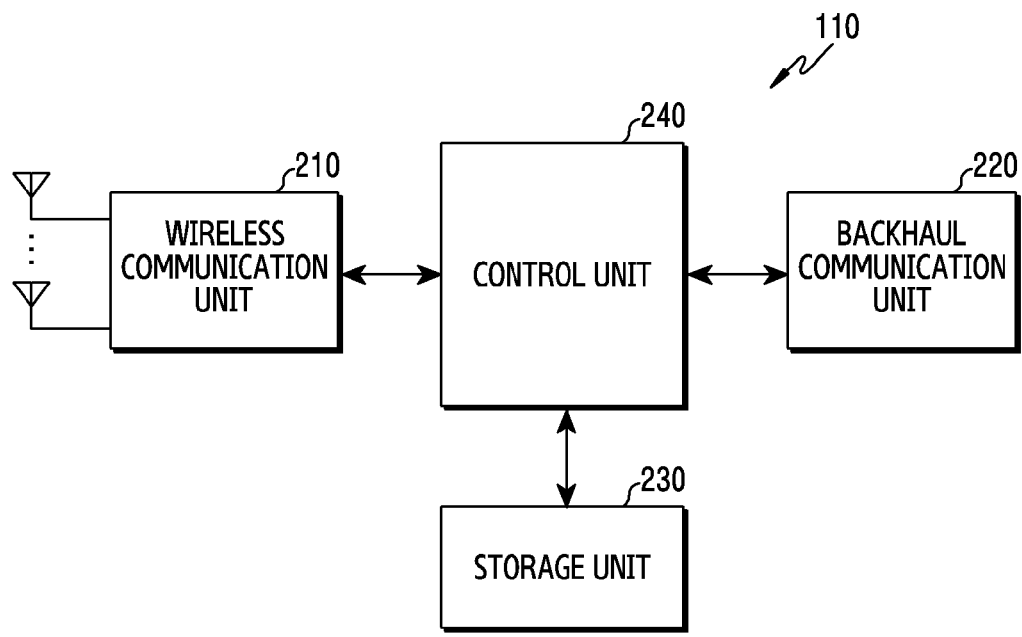

[Fig. 3]
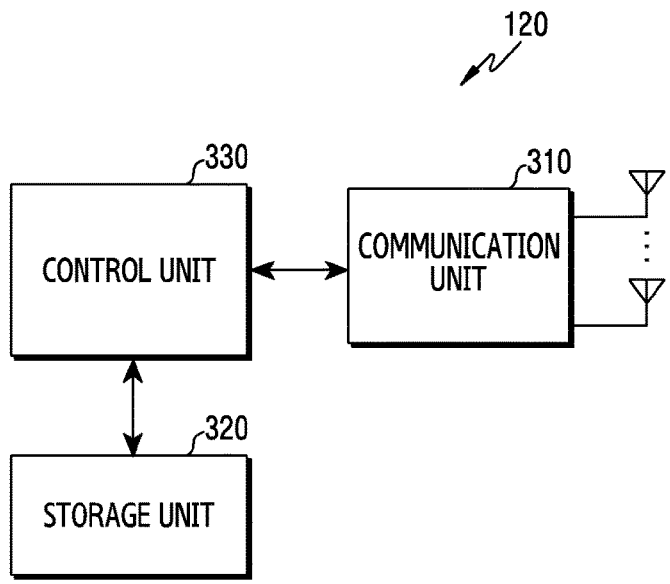
[Fig. 4]
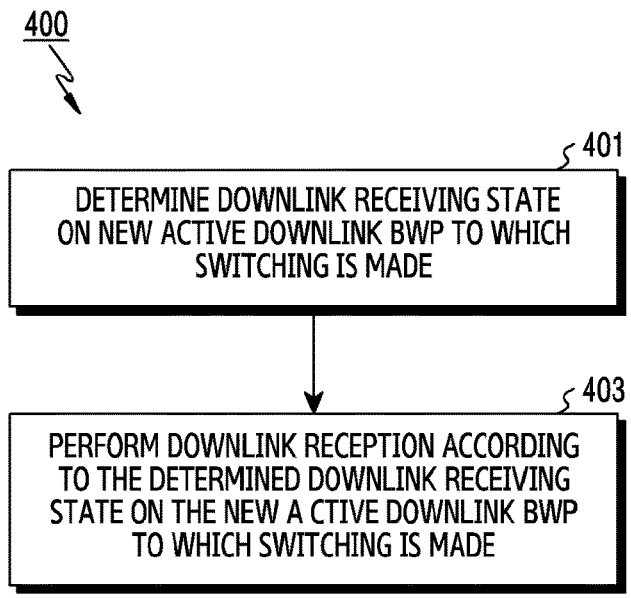
[Fig. 5]
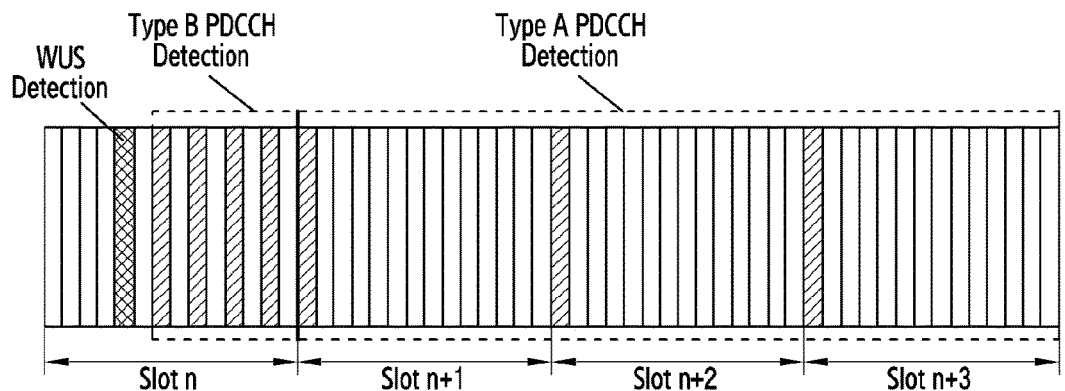

[Fig. 6]
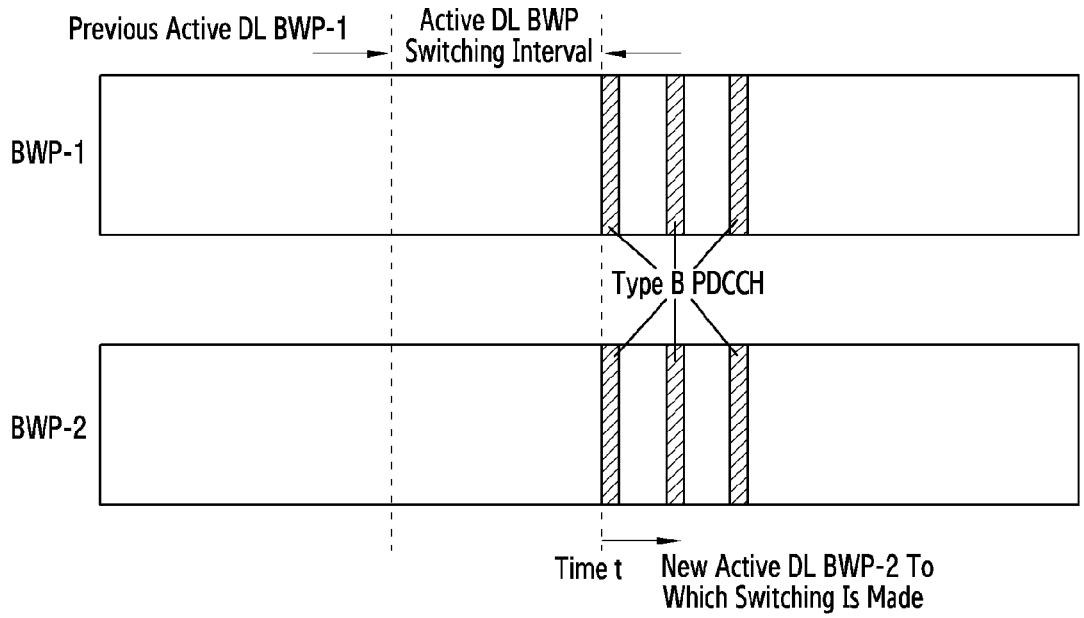
[Fig. 7]
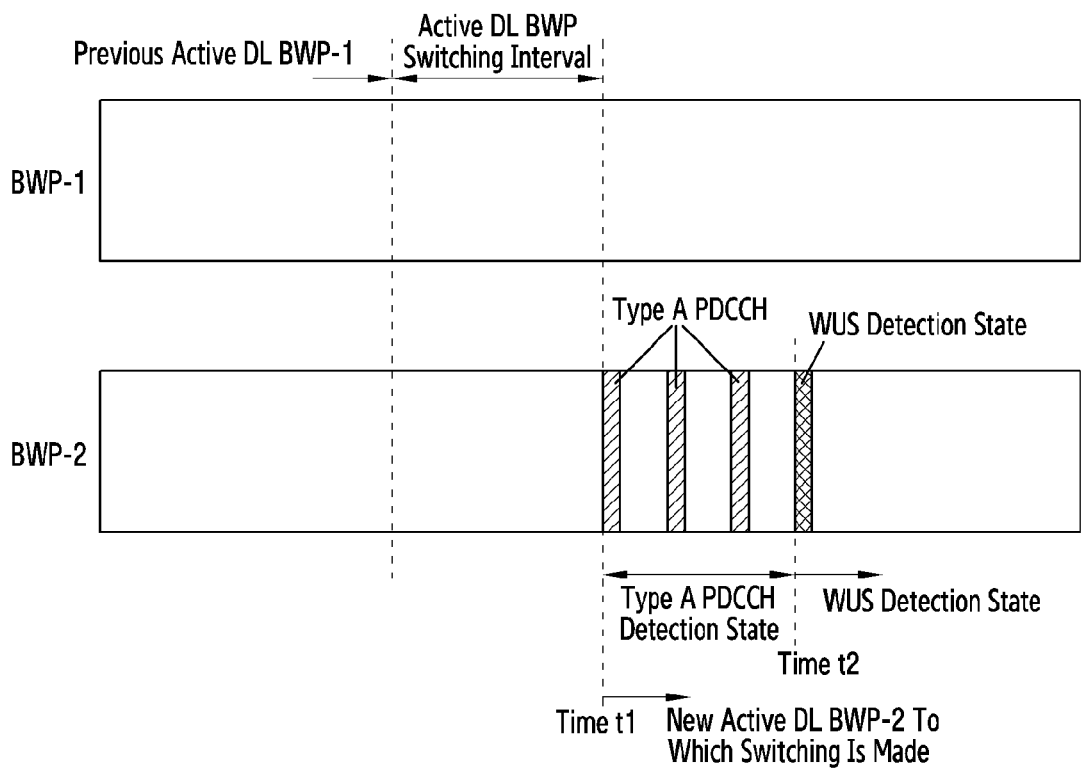

[Fig. 8]
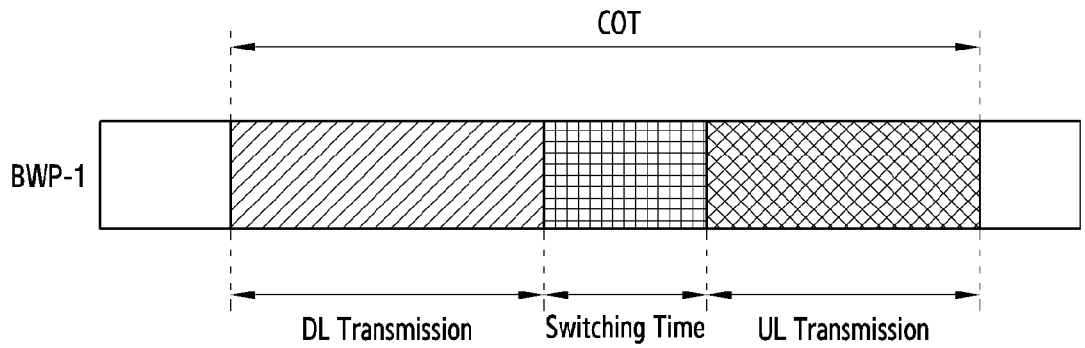
[Fig. 9]
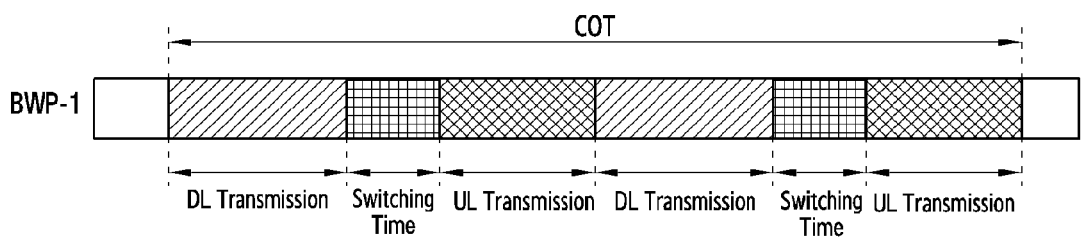
[Fig. 10]
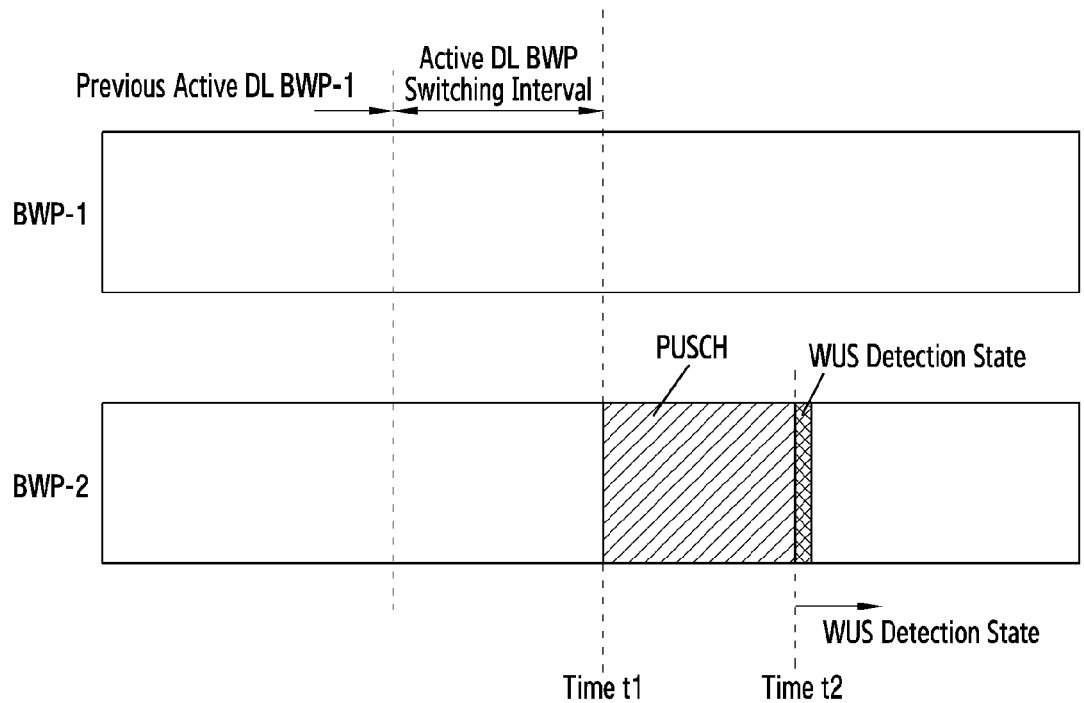

[Fig. 11]
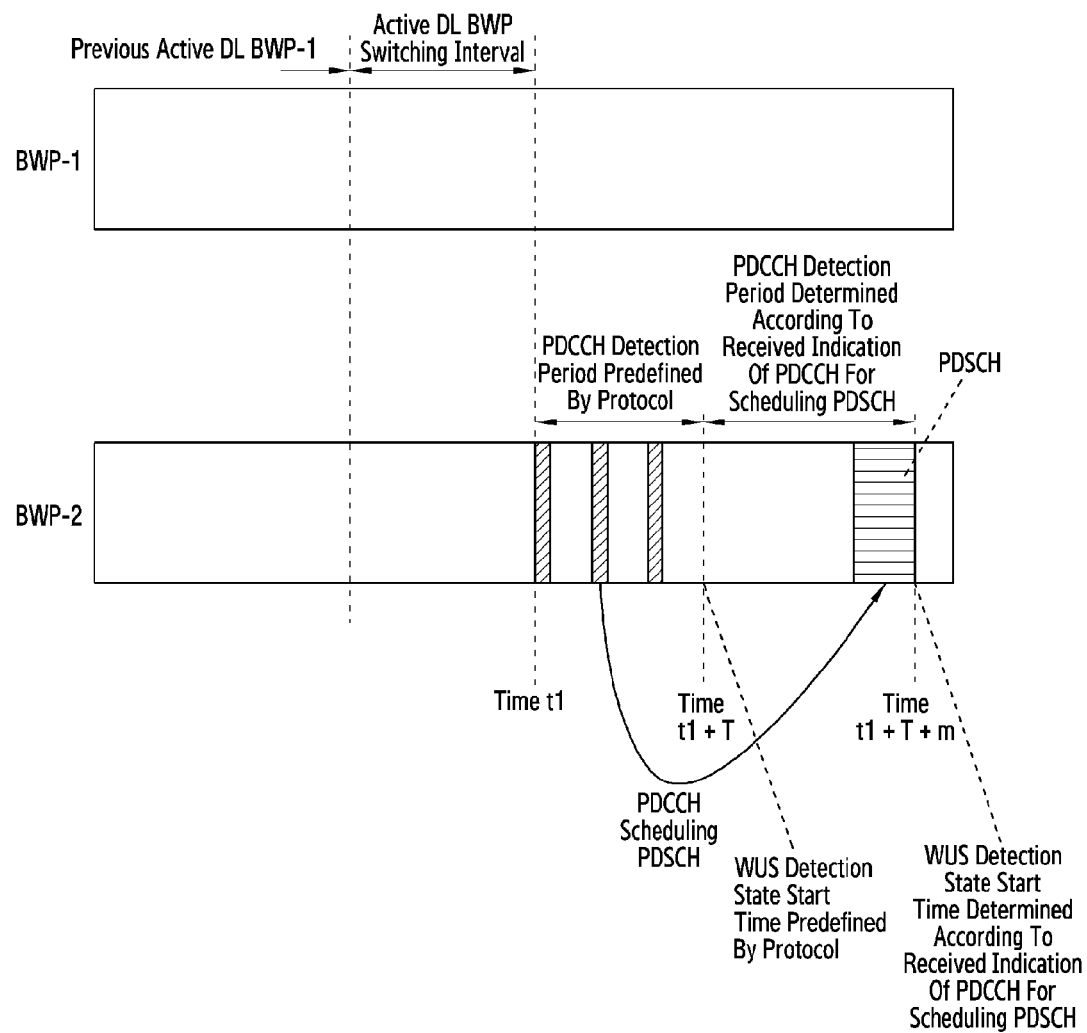

[Fig. 12]
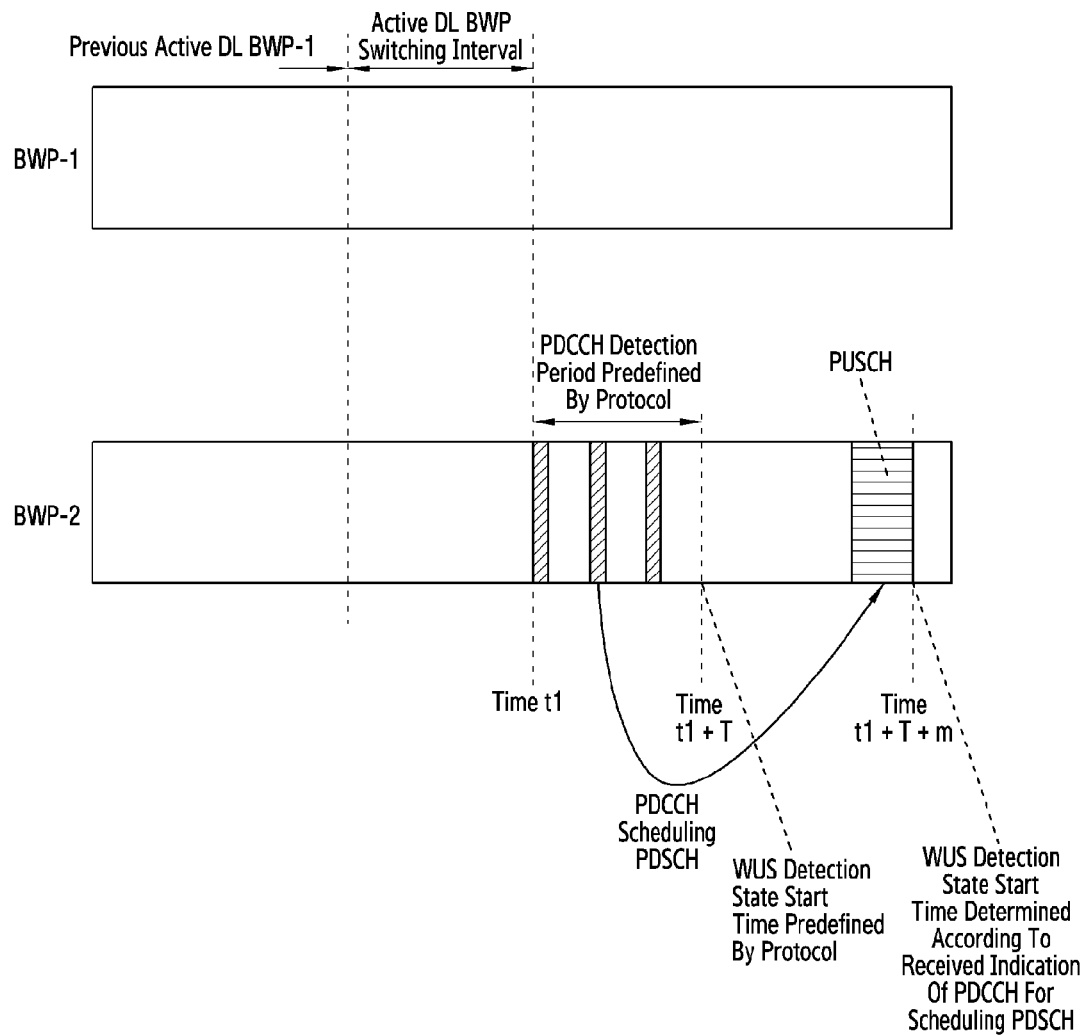
[Fig. 13]
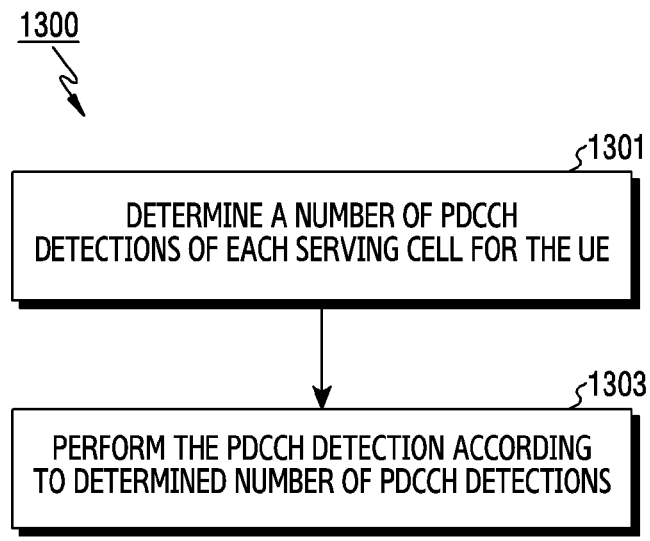

[Fig. 14]
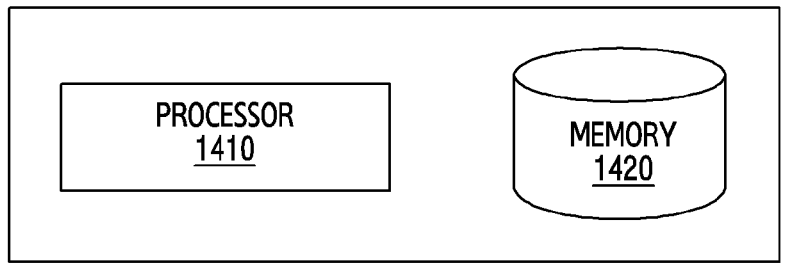
[Fig. 15]
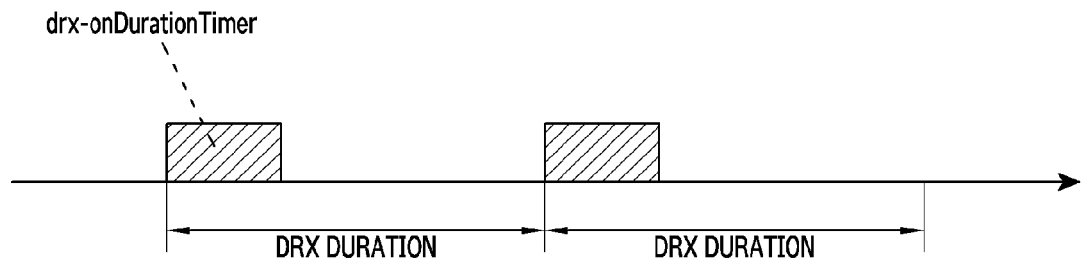
[Fig. 16]
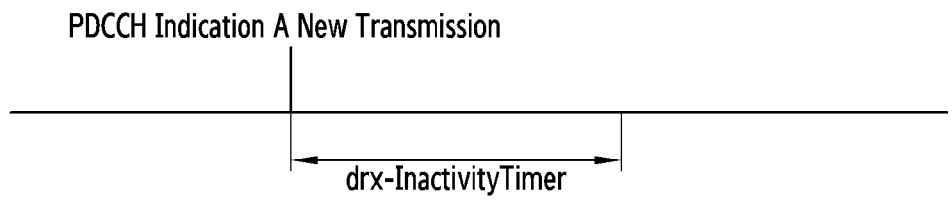

APPARATUS AND METHOD FOR DETECTING CONTROL CHANNEL IN WIRELESS COMMUNICATION SYSTEM

TECHNICAL FIELD

The present disclosure relates to wireless communication technology, and in particular to an apparatus and a method for detecting a downlink control channel in a wireless communication system.

BACKGROUND ART

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

DISCLOSURE OF INVENTION

Technical Problem

It is an object of the present disclosure that an apparatus and a method for effectively detecting a downlink control channel in a wireless communication system.

Solution to Problem

According to an aspect of the present disclosure, a method for downlink reception is provided. The method includes: determining a downlink receiving state on an active bandwidth part (BWP) to which switching is made; and performing downlink reception according to the determined downlink receiving state on the active downlink BWP to which switching is made.

In an exemplary embodiment, the downlink receiving state includes: a wake-up signal detection state, and a physical downlink control channel (PDCCH) detection state.

In an exemplary embodiment, said determining the downlink receiving state on the active downlink BWP to which switching is made includes: using, by a UE, a downlink receiving state on a previous active downlink BWP on the active downlink BWP to which switching is made, if the previous active downlink BWP and the active downlink BWP to which switching is made are determined by one and the same carrier sensing as being idle or busy.

In an exemplary embodiment, said determining the downlink receiving state on the active downlink BWP to which switching is made includes: determining, by a UE, the downlink receiving state on the active downlink BWP to which switching is made according to common indication information or physical layer signaling, or according to predefinition by protocol or higher layer signaling configuration, if a previous active downlink BWP and the active downlink BWP to which switching is made are determined by respective separate carrier sensing as being idle or busy.

In an exemplary embodiment, the method further includes: triggering switching of the active downlink BWP by received downlink control information (DCI) for scheduling a downlink data channel.

In an exemplary embodiment, said determining the downlink receiving state on the active downlink BWP to which switching is made includes one of the following modes, in which 1) the UE determines, according to the predefinition by protocol or the higher layer signaling configuration, the downlink receiving state used on the active downlink BWP to which switching is made;
2) the UE determines, according to the received physical layer signaling or common indication information, the downlink receiving state used on the active downlink BWP to which switching is made;
3) the UE determines to use the wake-up signal detection state and the PDCCH detection state at the same time;
4) if the UE receives the physical layer signaling or the common indication information, it uses mode 2); if the UE does not receive the physical layer signaling and the common indication information, it uses mode 1) or mode 3), or determines to use mode 1) or mode 3) according to the received higher level signaling configuration.

In an exemplary embodiment, the method further includes: triggering switching of the active downlink BWP by received DCI for scheduling an uplink data channel.

In an exemplary embodiment, in a case where there is only one switching point between a downlink transmission and an uplink transmission in a Channel Occupation Time (COT), the UE determines that the downlink receiving state on the active downlink BWP to which switching is made is the wake-up signal detection state.

In an exemplary embodiment, in a case where there is more than one switching point between the downlink transmission and the uplink transmission in the COT, said determining the downlink receiving state on the active downlink BWP to which switching is made includes one of the following modes, in which 1) the UE determines, according to the predefinition by protocol or the higher layer signaling configuration, the downlink receiving state used on the active downlink BWP to which switching is made;
2) the UE determines, according to the received physical layer signaling or common indication information, the downlink receiving state used on the active downlink BWP to which switching is made;
3) the UE determines to use the wake-up signal detection state and the PDCCH detection state at the same time;
4) if the UE receives the physical layer signaling or the common indication information, it uses mode 2); if the UE does not receive the physical layer signaling and the common indication information, it uses mode 1) or mode 3), or determines to use mode 1) or mode 3) according to the received higher level signaling configuration.

In an exemplary embodiment, the method further includes: triggering the switching of the active downlink BWP by a timer.

In an exemplary embodiment, said determining the downlink receiving state on the active downlink BWP to which switching is made includes one of the following modes, in which 1) the UE determines, according to the predefinition by protocol or the higher layer signaling configuration, the downlink receiving state used on the active downlink BWP to which switching is made;

2) the UE determines, according to the received common indication information, the downlink receiving state used on the active downlink BWP to which switching is made;

3) the UE determines to use the wake-up signal detection state and the PDCCH detection state at the same time;

4) if the UE receives the common indication information, it uses mode 2); if the UE does not receive the common indication information, it uses mode 1) or mode 3), or determines to use mode 1) or mode 3) according to the received higher level signaling configuration.

According to another aspect of the present disclosure, a method for performing PDCCH detection is provided. The method includes: in a case where at least one of serving cells configured for a UE is configured with a plurality of downlink BWPs, determining a number of PDCCH detections of each serving cell for the UE; and performing the PDCCH detection according to the determined number of PDCCH detections.

In an exemplary embodiment, if the UE is configured with carrier aggregation (CA) or dual connectivity (DC), a CA or DC capability of the UE supports more than a predetermined number of serving cells, and the UE is configured with more than the predetermined number of serving cells, wherein subcarrier spacing configurations of the plurality of downlink BWPs with which the at least one serving cell is configured are not exactly identical, said determining the number of PDCCH detections of each serving cell for the UE includes:

setting a maximum number of detections of PDCCHs of different sizes $M_{PDCCH}^{\mu}$ of the UE in each slot in the active downlink BWP of each serving cell with a subcarrier spacing configuration as $M_{PDCCH}^{\mu}=\min\{M_{PDCCH}^{max,slot,\mu}, \lfloor N_{cells}^{cap} * M_{PDCCH}^{max,slot,\mu} / N_{cells}^{DL} \rfloor\}$, and setting a maximum number of detections of non-overlapping Control Channel Element 'CCE' $C_{PDCCH}^{\mu}$ of the UE in each slot in the active downlink BWP of each serving cell with the subcarrier spacing configuration as $C_{PDCCH}^{\mu}=\min\{C_{PDCCH}^{max,slot,\mu}, \lfloor N_{cells}^{cap} * C_{PDCCH}^{max,slot,\mu} / N_{cells}^{DL} \rfloor\}$, where $M_{PDCCH}^{max,slot,\mu}$ represents a maximum number of PDCCHs of different sizes detected in each slot of each serving cell with the subcarrier spacing configuration μ, $C_{PDCCH}^{max,slot,\mu}$ represents a maximum number of non-overlapping CCEs detected in each slot of each serving cell with the subcarrier spacing configuration μ, $N_{cells}^{cap}$ represents a number of serving cells for which the PDCCHs can be detected by the UE, which is indicated by a parameter, $N_{cells}^{DL,\mu}$ represents a number of serving cells with the subcarrier spacing configuration μ which are configured for the UE, and $\lfloor \ldots \rfloor$ represents a flooring operation; and determining the number of detections of PDCCHs of each serving cell for the UE by considering both the maximum number of detections of PDCCHs $M_{PDCCH}^{\mu}$ and the maximum number of detections of CCEs $C_{PDCCH}^{\mu}$.

In an exemplary embodiment, if the UE is configured with CA or DC, a CA or DC capability of the UE supports more than a predetermined number of serving cells, and the UE is configured with more than the predetermined number of serving cells, wherein subcarrier spacing configurations of the plurality of downlink BWPs with which the at least one serving cell is configured are not exactly identical, said determining the number of PDCCH detections of each serving cell for the UE includes:

determining, for the at least one serving cell configured with a plurality of downlink BWPs, a reference subcarrier spacing configuration $\mu_{ref}$ as a subcarrier spacing configuration of the at least one serving cell, wherein subcarrier spacing configurations of the configured downlink BWPs are not exactly identical;

according to the determined reference subcarrier spacing configuration $\mu_{ref}$, setting a sum $M_{PDCCH}^{total,slot,\mu_{ref}}$ of respective maximum numbers of detections of PDCCHs of different sizes of the UE in each slot of $N_{cells}^{DL,\mu_{ref}}$ serving cells with the subcarrier spacing configuration $\mu_{ref}$ as $$M_{PDCCH}^{total,slot,\mu_{ref}} = \min\left\{N_{cells}^{DL,\mu_{ref}} \times M_{PDCCH}^{max,slot,\mu_{ref}}, \left\lfloor \frac{N_{cells}^{cap} \times M_{PDCCH}^{max,slot,\mu_{ref}} \times N_{cells}^{DL,\mu_{ref}}}{\sum_{\mu=0}^{3} N_{cells}^{DL,\mu_{ref}}} \right\rfloor\right\},$$

and setting a sum $C_{PDCCH}^{total,slot,\mu_{ref}}$ of respective maximum numbers of detections of non-overlapping CCEs in each slot of $N_{cells}^{DL,\mu_{ref}}$ serving cells with the subcarrier spacing configuration $\mu_{ref}$ as $$C_{PDCCH}^{total,slot,\mu_{ref}} = \min\left\{N_{cells}^{DL,\mu_{ref}} \times C_{PDCCH}^{max,slot,\mu_{ref}}, \left\lfloor \frac{N_{cells}^{cap} \times C_{PDCCH}^{max,slot,\mu_{ref}} \times N_{cells}^{DL,\mu_{ref}}}{\sum_{\mu=0}^{3} N_{cells}^{DL,\mu_{ref}}} \right\rfloor\right\},$$

where $N_{cells}^{DL,\mu_{ref}}$ represents a number of serving cells with the reference subcarrier spacing configuration $\mu_{ref}$ which are configured for the UE, $M_{PDCCH}^{max,slot,\mu_{ref}}$ represents a maximum number of PDCCHs of different sizes detected in each slot of each serving cell with the reference subcarrier spacing configuration $\mu_{ref}$, $C_{PDCCH}^{max,slot,\mu_{ref}}$ represents a maximum number of non-overlapping CCEs detected in each slot of each serving cell with the reference subcarrier spacing configuration $\mu_{ref}$, $N_{cells}^{cap}$ represents a number of serving cells for which the PDCCHs can be detected by the UE, which is indicated by a parameter, $N_{cells}^{DL,\mu_{ref}}$ represents a number of serving cells with the reference subcarrier spacing configuration $\mu_{ref}$ which are configured for the UE, and $\lfloor \ldots \rfloor$ represents a flooring operation;

calculating a maximum number of PDCCH detections of each serving cell for the UE according to the sum $M_{PDCCH}^{total,slot,\mu_{ref}}$ of the maximum numbers of detections of PDCCHs, and calculating a maximum number of detections of CCEs of each serving cell for the UE according to the sum $C_{PDCCH}^{total,slot,\mu_{ref}}$ of the maximum numbers of detections of CCEs; and determining the number of PDCCH detections of each serving cell for the UE by considering both the calculated maximum number of PDCCH detections and maximum number of detections of CCEs of each serving cell for the UE.

In an exemplary embodiment, a largest or smallest one of the subcarrier spacing configurations of the plurality of downlink BWPs configured in the serving cell configured with the plurality of downlink BWPs is used as the reference subcarrier spacing configuration $\mu_{ref}$.

In an exemplary embodiment, if the UE is configured with CA or DC, a CA or DC capability of the UE supports up to a predetermined number of serving cells, and the UE is configured with the predetermined number of serving cells or less, wherein subcarrier spacing configurations of the plurality of downlink BWPs with which the at least one serving cell is configured are not exactly identical, said determining the number of PDCCH detections of each serving cell for the UE includes:

determining a maximum number of detections of PDCCHs of different sizes $M_{PDCCH}^{max,slot,\mu}$ and a maximum number of detections of non-overlapping $C_{PDCCH}^{max,slot,\mu}$ of the UE in each slot in the active downlink BWP of each serving cell with a subcarrier spacing configuration $\mu$ respectively, according to a predetermined correspondence between the subcarrier spacing configuration $\mu$ of each serving cell and a maximum number of PDCCHs of different sizes $M_{PDCCH}^{max,slot,\mu}$ detected in each slot of each serving cell, and a maximum number of non-overlapping CCEs $C_{PDCCH}^{max,slot,\mu}$ detected in each slot of each serving cell; and determining the number of PDCCH detections of each serving cell for the UE by considering both the maximum number of detections of PDCCHs $M_{PDCCH}^{max,slot,\mu}$ and the maximum number of detections of CCEs $C_{PDCCH}^{max,slot,\mu}$.

According to another aspect of the present disclosure, a UE is provided. The UE includes: a processor; and a memory storing computer executable instructions that, when executed by the processor, cause the UE to perform the methods as previously described.

According to another aspect of the present disclosure, a computer-readable medium is provided, the computer-readable medium having stored thereon instructions which, when executed by a processor, cause the processor to perform the methods as previously described.

With the technical solutions of the present disclosure, the unlicensed spectrum resources may be sufficiently utilized and the power consumption of the UE may be saved by performing the downlink reception reasonably according to the determined downlink receiving state on the active downlink BWP to which switching is made.

In addition, in the case where at least one of serving cells configured for the UE is configured with a plurality of downlink BWPs, both the maximum number of detections of PDCCHs $M_{PDCCH}^{\mu}$ and the maximum number of detections of CCEs $C_{PDCCH}^{\mu}$ which are set in the above manners are considered to determine the number of PDCCH detections of each serving cell for the UE, which may avoid the problem that the base station and the UE may have different understandings regarding the maximum number of detections of PDCCHs and the maximum number of detections of CCEs due to the error in the indication of the active downlink BWP switching.

In the case where at least one of serving cells configured for the UE is configured with a plurality of downlink BWPs, both the sum $M_{PDCCH}^{total,slot,\mu_{ref}}$ of the maximum numbers of detections of PDCCHs and the sum $C_{PDCCH}^{total,slot,\mu_{ref}}$ of the maximum numbers of detections of CCEs which are set in the above manners are considered to determine the sum of respective numbers of PDCCH detections of the UE in $N_{cells}^{DL,\mu_{ref}}$ serving cells with the subcarrier spacing configuration $\mu_{ref}$ of the active downlink BWP, and calculate the number of PDCCH detections of each serving cell for the UE. The UE may determine the maximum number of PDCCH detections and the maximum number of detections of CCEs according to the reference subcarrier spacing configuration of each serving cell, without having different understanding on the maximum number of detections of PDCCHs of different sizes and the maximum number of non-overlapping CCEs in each slot of other serving cells between the UE and the base station due to different understandings on the subcarrier spacing configuration of the active downlink BWP between the UE and the base station.

Advantageous Effects of Invention

Various embodiments of the present disclosure provide a scheme for detecting a control channel that is more effective.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. The skilled in the art may also obtain other drawings based on these drawings without any creative work.

FIG. 1 illustrates a wireless communication system according to an embodiment;

FIG. 2 illustrates a base station in a wireless communication system according to an embodiment;

FIG. 3 illustrates a terminal in a wireless communication system according to an embodiment;

FIG. 4 illustrates a flowchart of a method for downlink reception according to an exemplary embodiment of the present disclosure;

FIG. 5 illustrates a first schematic diagram of downlink receiving state determination according to an exemplary embodiment of the present disclosure;

FIG. 6 illustrates a second schematic diagram of downlink receiving state determination according to an exemplary embodiment of the present disclosure;

FIG. 7 illustrates a third diagram of downlink receiving state determination according to an exemplary embodiment of the present disclosure;

FIG. 8 illustrates a fourth diagram of downlink receiving state determination according to an exemplary embodiment of the present disclosure;

FIG. 9 illustrates a fifth schematic diagram of downlink receiving state determination according to an exemplary embodiment of the present disclosure;

FIG. 10 illustrates a sixth schematic diagram of a downlink receiving state determination according to an exemplary embodiment of the present disclosure;

FIG. 11 illustrates a first schematic diagram of downlink receiving state determination according to another exemplary embodiment of the present disclosure;

FIG. 12 illustrates a second schematic diagram of downlink receiving state determination according to another exemplary embodiment of the present disclosure;

FIG. 13 illustrates a flowchart of a method for performing PDCCH detection according to still another exemplary embodiment of the present disclosure;

FIG. 14 illustrates a schematic structure diagram of a UE according to an exemplary embodiment of the present disclosure;

FIG. 15 illustrates a schematic diagram of a DRX duration according to an exemplary embodiment of the present disclosure; and FIG. 16 illustrates a schematic diagram of DRX timing according to an exemplary embodiment of the present disclosure.

BEST MODE FOR CARRYING OUT THE INVENTION

Terms used in the present disclosure are used for describing particular embodiments and are not intended to limit the present disclosure. A singular expression may include a plural expression unless plainly different according to a context or unless explicitly represented otherwise. Further, unless defined otherwise, all the terms used herein, including technical and scientific terms, may have the same meanings as those generally understood by a person skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even when terms are defined in this disclosure, the terms should not be interpreted to exclude the embodiments.

In various embodiments to be described below, a hardware approach may be described as an example. However, it is understood that various embodiments may include a technology using both hardware and software, and various embodiments do not exclude a software-based approach.

Various embodiments provide an apparatus and a method for selecting a beam in a wireless communication system. More specifically, the present disclosure describes a technique for selecting a common beam used for a plurality of carriers in the wireless communication system.

Terms indicating signals, terms indicating signal propagation characteristics (e.g., directivity), terms indicating control information, terms indicating network entities, and terms indicating components of a device, which are used in the following descriptions, are for the sake of explanations. Accordingly, the present disclosure is not limited to the terms to be described, and may use other terms having technically identical or similar meaning.

In this disclosure, to determine whether a specific condition is satisfied or fulfilled, expressions such as "greater than" or "less than" are used by way of example and expressions such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versal), etc.

The present disclosure provides various embodiments using terms used in some communication standards by way of example. Various embodiments may be easily used in or may be applicable to other communication systems.

FIG. 1 illustrates a wireless communication system according to an embodiment. FIG. 1 depicts a base station 110, a terminal 120, and a terminal 130 as some of nodes that use a radio channel in the wireless communication system. While FIG. 1 depicts a single base station, another base station that is the same as or similar to the base station 110 may be further included.

The base station 110 is a network infrastructure that provides radio access to the terminals 120 and 130. The base station 110 has coverage defined as a geographical area based on a signal transmission distance. The base station 110 may be referred to as an access point (AP), an eNodeB (eNB), a 5th generation node (5G node), a next generation nodeB (gNB), a wireless point, a transmission/reception point (TRP), or other terms having a technically equivalent meaning.

The terminal 120 and the terminal 130 are each used by a user and communicate with the base station 110 over a radio (or wireless) channel. In some cases, at least one of the terminal 120 and the terminal 130 may operate without a user's involvement. That is, at least one of the terminal 120 and the terminal 130 may perform machine type communication (MTC) and may not be carried by the user. The terminal 120 and the terminal 130 each may be referred to as a user equipment (UE), a mobile station, a subscriber station, a remote terminal, a wireless terminal, a user device, or other terms having a technically equivalent meaning.

The base station 110, the terminal 120, and the terminal 130 may transmit and receive radio signals (e.g., wireless signals) in a millimeter wave (mmWave) band (e.g., 28 GHz, 30 GHz, 38 GHz, 60 GHz). To improve channel gain, the base station 110, the terminal 120, and the terminal 130 may conduct (or perform) beamforming. Herein, the beamforming may include transmit beamforming (or transmission beamforming) and receive beamforming (or reception beamforming). That is, the base station 110, the terminal 120, and the terminal 130 may apply directivity to a transmit signal or a receive signal. To this end, the base station 110 and the terminals 120 and 130 may select serving beams 112, 113, 121, and 131 through a beam search or beam management procedure. After the serving beams 112, 113, 121, and 131 are selected, communications may be performed using resources that are quasi co-located (QCL) with resources used for transmitting the serving beams 112, 113, 121, and 131.

If large-scale properties of a channel that carries a symbol on a first antenna port may be inferred from a channel that carries a symbol on a second antenna port, the first antenna port and the second antenna port may be said to be QCL. For example, the large-scale properties may include at least one of delay spread, Doppler spread, Doppler shift, average gain, average delay, and spatial receive parameter.

FIG. 2 illustrates a base station 110 in a wireless communication system according to an embodiment. FIG. 2 depicts a configuration of the base station 110. In the following description, it is understood that a term such as "module", "unit", "portion", "-or" or "-er" indicates a unit for processing at least one function or operation, and may be implemented using hardware, software, or a combination of hardware and software.

Referring to FIG. 2, the base station 110 includes a wireless communication unit 210 (e.g., wireless communicator or wireless communication interface), a backhaul communication unit 220 (e.g., backhaul communicator or backhaul communication interface), a storage unit 230 (e.g., storage), and a control unit 240 (e.g., at least one processing device).

The wireless communication unit 210 may transmit and receive signals over a radio (or wireless) channel. For example, the wireless communication unit 210 performs a conversion function between a baseband signal and a bit string (or bit stream) according to a physical layer standard of the system. By way of further example, when data is transmitted, the wireless communication unit 210 generates complex symbols by encoding and modulating a transmit bit string (or transmission bit stream). Similarly, when data is received, the wireless communication unit 210 restores a receive bit string (or reception bit stream) by demodulating and decoding a baseband signal.

Furthermore, the wireless communication unit 210 up-converts the baseband signal to a radio frequency (RF) band signal, transmits the RF band signal via an antenna, and down-converts an RF band signal received via an antenna to a baseband signal. To this end, the wireless communication unit 210 may include at least one of a transmit filter, a receive filter, an amplifier, a mixer, an oscillator, a digital to analog convertor (DAC), an analog to digital convertor (ADC), and the like. In addition, the wireless communication unit 210 may include or utilize a plurality of transmit (or transmission) and receive (or reception) paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to an operating power and an operating frequency. The digital unit may include at least one processor (e.g., a digital signal processor (DSP)).

As described above, the wireless communication unit 210 transmits and receives signals. Hence, the entirety or a part of the wireless communication unit 210 may be referred to as a transmitter, a receiver, or a transceiver. Hereinbelow, transmission and the reception over a radio (or wireless) channel may include the above-described processing of the wireless communication unit 210.

The backhaul communication unit 220 provides an interface for communicating with other nodes in the network. That is, the backhaul communication unit 220 converts a bit sting transmitted from the base station 110 to another node, for example, to another access node, another base station, an upper node, or a core network, to a physical signal, and converts a physical signal received from the other node to a bit string.

The storage unit 230 stores data, such as a basic program, an application program, configuration information, settings, and the like for operating the base station. The storage unit 230 may include a volatile memory, a non-volatile memory, or a combination of a volatile memory and a non-volatile memory. The storage unit 230 provides the stored data in response to a request from the control unit 240.

The control unit 240 controls general operations of the base station. For example, the control unit 240 transmits and receives signals through the wireless communication unit 210 or the backhaul communication unit 220. Also, the control unit 240 records data to the storage unit 230 and reads data from the storage unit 230. The control unit 240 may execute functions of a protocol stack required by or included in a particular communication standard. According to another embodiment, the protocol stack may be included in and/or implemented via the wireless communication unit 210. To this end, the control unit 240 may include at least one processor.

According to an embodiment, the control unit 240 may determine at least one beam to communicate with a terminal (e.g., the terminal 120). For example, the control unit 240 may determine a transmit (or transmission) beam of the base station 110 based on a feedback from the terminal. Further, the control unit 240 may determine at least one of a receive (or reception) beam of the base station 110 and a transmit beam of the terminal using a signal transmitted from the terminal. Additionally, the control unit 240 may transmit information indicating the determined transmit beam of the terminal, to the terminal. For example, the control unit 240 may control the base station 110 to carry out operations explained below according to one or more embodiments.

FIG. 3 illustrates a terminal 120 in a wireless communication system according to an embodiment. In the following description, it is understood that a term such as "module", "unit", "portion", "-or" or "-er" indicates a unit for processing at least one function or operation, and may be implemented using hardware, software, or a combination of hardware and software.

Referring to FIG. 3, the terminal 120 includes a communication unit 310 (e.g., communicator or communication interface), a storage unit 320 (e.g., storage), and a control unit 330 (e.g., at least one processor). By way of example, the terminal 120 may be a cellular phone or other device that communicates over a cellular network (such as a 5G or pre-5G network).

The communication unit 310 may transmit and receive signals over a radio channel. For example, the communication unit 310 performs a conversion function between a baseband signal and a bit string according to a physical layer standard of the system. By way of further example, when data is transmitted, the communication unit 310 generates complex symbols by encoding and modulating a transmit bit string. Similarly, when data is received, the communication unit 310 restores a receive bit string by demodulating and decoding a baseband signal. Furthermore, the communication unit 310 up-converts the baseband signal to an RF band signal, transmits the RF band signal via an antenna, and down-converts an RF band signal received via the antenna to a baseband signal. For example, the communication unit 310 may include at least one of a transmit filter, a receive filter, an amplifier, a mixer, an oscillator, a DAC, an ADC, and the like.

Also, the communication unit 310 may include or utilize a plurality of transmit and receive paths. Further, the communication unit 310 may include at least one antenna array including a plurality of antenna elements. In terms of hardware, the communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform beamforming.

As described above, the communication unit 310 transmits and receives signals. Hence, the entirety or a part of the communication unit 310 may be referred to as a transmitter, a receiver, or a transceiver. Hereinbelow, the transmission and the reception over the radio channel may include the above-described processing of the communication unit 310.

The storage unit 320 stores data, such as a basic program, an application program, configuration information, settings, and the like for operating the terminal. The storage unit 320 may include a volatile memory, a non-volatile memory, or a combination of a volatile memory and a non-volatile memory. The storage unit 320 provides the stored data according to a request from the control unit 330.

The control unit 330 controls general operations of the terminal. For example, the control unit 330 transmits and receives signals through the communication unit 310. Also, the control unit 330 records data to the storage unit 320 and reads data from the storage unit 320. The control unit 330 may execute functions of a protocol stack required by or included in a particular communication standard. To this end, the control unit 330 may include at least one processor or microprocessor, or may be part of a processor. Part of the communication unit 310 and the control unit 330 may be referred to as a communication processor (CP).

According to an embodiment, the control unit 330 may determine at least one beam for communication with a base station (e.g., the base station 110). For example, the control unit 330 may determine at least one of a receive beam of the terminal 120 and a transmit beam of the base station using a signal transmitted from the base station. Further, the control unit 330 may transmit information indicating the determined transmit beam of the base station, to the base station. For example, the control unit 330 may determine the transmit beam of the base station based on a request from the base station. Further, the control unit 330 may control the terminal to carry out operations, to be explained below, according to one or more embodiments.

In an NR (New Radio) air interface system, a bandwidth of a carrier is relatively large, and some UE has a limited bandwidth capability and can only transmit or receive signals and channels in a part of frequency domain bandwidth of the carriers; while some UE has a relatively strong bandwidth capability and can transmit or receive signals and channels in an entire frequency domain bandwidth of the carriers. The so-called bandwidth capability of the UE herein refers to a maximum bandwidth at which the UE may simultaneously receive or transmit signals and channels in the frequency domain. For example, some UE has a bandwidth capacity of 20 megahertz (MHz), and some UE has a bandwidth capacity of 5 megahertz. For the UE with a poor bandwidth capability, in order to improve the UE's frequency diversity performance, the UE may work in a limited frequency band with a good performance at different time instants. One limited frequency band is called a bandwidth part (BWP). That is, the UE may switch to different BWPs at different time instants to receive and transmit signals and channels.

As the contradiction between the users' demands for broadband wireless services and the scarcity of spectrum resources becomes increasingly acute, mobile operators have begun to consider non-licensed bands (also known as unlicensed bands) as a supplement to licensed bands. The 3rd Generation Partnership Project (3GPP) has determined a scheme of effective carrier aggregation by the unlicensed bands and the licensed bands, which effectively improves the spectrum utilization of the whole network under the premise that there is no significant impact on other technologies in the unlicensed bands.

Generally, the unlicensed bands have been allocated for some other purposes, such as radar or 802.11 series Wireless Fidelity (WiFi). In this way, the interference level is uncertain in the unlicensed bands, which makes it generally difficult to guarantee a quality of service (QoS) of an LTE transmission, but the unlicensed bands can still be used for data transmission with a lower QoS requirement. Here, a Long Term Evolution (LTE) system in which a secondary cell is deployed on the unlicensed bands is referred to as a licensed assisted access (LAA) system. In the unlicensed bands, how to avoid mutual interference between the LAA system and other wireless systems such as radar or WiFi is a critical problem. Carrier sensing (also known as carrier channel access (CCA)) is a collision avoidance mechanism commonly used in the unlicensed bands. A mobile station (MS) must detect the radio channel before transmitting a signal, and may occupy the radio channel to transmit the signal only if it detects that the radio channel is idle. LAA also follows a similar mechanism to ensure lower interference with other signals. The LAA device (a base station or a terminal) is turned on/off dynamically according to the carrier sensing result, i.e., transmitting if it is sensed that the channel is idle, and not transmitting if the channel is busy. In the LTE LAA system, the bandwidth of the base station for carrier sensing is the bandwidth of the carrier, and the bandwidth capability of each of all the UEs is greater than or equal to the bandwidth of the carrier. Therefore, all the UEs also perform the carrier sensing on the entire bandwidth of the carrier.

Since the bandwidth of the carrier may be relatively large in the NR system, the carrier sensing over the entire carrier bandwidth may reduce the chance of occupying the carrier. It is possible that a part of the entire carrier bandwidth is busy while other parts are idle, and the result of carrier sensing on the entire carrier bandwidth may be busy. Therefore, the resources in the entire carrier bandwidth cannot be occupied. If a sub-band in the carrier bandwidth is used for carrier sensing, i.e., the carrier sensing is performed in units of sub-bands, the resources in the sub-band for which the carrier sensing result is idle may be utilized, which increases the chances of the carriers being occupied, thereby improving the spectrum utilization.

Since the carrier sensing is to be performed before the signal or channel is transmitted on the unlicensed band, and the chance that the carrier sensing result is idle is random, the time instant at which the base station transmits the signal and the channel is also random. In view of this, it is desired to provide a method for downlink reception performed by the UE when the UE switches the active BWP and a UE capable of performing the method.

The embodiments of the present disclosure may be applied to the shared bands or the unlicensed band, and devices (including the base station and the UE) need to perform carrier sensing before transmitting data. The device may transmit the data only if the carrier sensing result is idle. The device cannot transmit the data if the carrier sensing result is busy. The methods of the present disclosure may be applied to downlink data transmission, that is, the base station transmits data, and the UE receives data. At this time, the base station performs carrier sensing. At least two downlink BWPs may be configured within one carrier (which may also be referred to as a serving cell) in the present disclosure.

A flowchart of a method for downlink reception performed at a UE according to an exemplary embodiment of the present disclosure will be specifically described below with reference to FIG. 4.

FIG. 4 schematically illustrates a flowchart of a method 400 for downlink reception performed at a UE according to an exemplary embodiment of the present disclosure.

Referring to FIG. 4, in step 401, the UE determines a downlink receiving state on a new active downlink BWP (new active DL BWP) to which switching is made. That is, the UE determines a downlink receiving state on the new active DL BWP to which the UE switches. Specifically, the UE switches the active downlink BWP form a first downlink BWP to a second downlink BWP, and determines the downlink receiving state on the second downlink BWP. In step 403, the UE performs downlink reception according to the determined downlink receiving state on the new active downlink BWP to which switching is made. That is, the UE receives signals on the new active downlink BWP according to the determined downlink receiving state.

The downlink receiving state on the new active downlink BWP to which switching is made as described in step 401 will be described in detail below.

The new active downlink BWP to which switching is made in step 401 means that when the UE is configured with at least two downlink BWPs, the active downlink BWP is switched from downlink BWP-1 to downlink BWP-2, and downlink BWP-2 is referred the new active downlink BWP to which switching is made.

The downlink receiving state on the new active downlink BWP to which switching is made as determined by the UE may be determined according to an explicit signaling indication, for example, common physical layer signaling or UE-specific physical layer signaling.

Alternatively, the downlink receiving state on the new active downlink BWP to which switching is made as determined by the UE may be determined according to an implicit signaling indication. For example, the downlink receiving state on the new active downlink BWP to which switching is made as determined by the UE may also be determined according to the triggering mode of the downlink BWP switching. For example, when the triggering mode of the active downlink BWP switching is triggered by a timer or triggered by DCI, the downlink receiving states on the new active downlink BWP to which switching is made in different triggering modes are determined respectively.

The downlink receiving state includes: a wake-up signal (WUS) detection state, and a PDCCH detection state. The PDCCH detection state includes a type A PDCCH detection state and a Type B PDCCH detection state, which will be described later. Herein, the WUS may be referred different terminology, for example, an initial signal, a preamble or other terms having a technically equivalent meaning.

The WUS is a reference signal set to reduce the implementation complexity of the UE and save the power consumption for the UE. In an exemplary embodiment, the UE starts detecting the PDCCH after detecting the WUS, so that unnecessary PDCCH detection may be reduced, and detection of the WUS may save power compared with detection of the PDCCH, so that the WUS may be used to reduce the implementation complexity of the UE and save the power consumption for the UE.

Since the time instant when the carrier sensing result is idle is random, this time instant may not be a start of a slot. In order to make full use of the downlink resources, after the UE just receives the WUS, the UE should detect the PDCCH in a smaller time period (referred to as type B PDCCH detection, for example, detecting the PDCCH with a period of 2 orthogonal frequency division multiplexing (OFDM) symbols). This may reduce the time instants when the carrier sensing result is idle and the interval at which the UE receives the PDCCH, so that the data may be received using the resources as soon as possible. After a certain period of time, the UE should detect the PDCCH in a longer time period (referred to as type A PDCCH detection, for example, detecting the PDCCH with a period of one slot) since there is no need for low-latency traffic transmission in the unlicensed bands. This may save the power consumption for the UE, and may also save the resources occupied by the PDCCH. The downlink receiving state according to the above exemplary embodiment is shown in FIG. 5.

If the UE is configured with the WUS detection, Type B PDCCH detection, and Type A PDCCH detection, the UE may be in one of these three downlink receiving states of WUS detection state, Type B PDCCH detection, and Type A PDCCH detection. If the UE is configured with the WUS detection and the PDCCH detection, the UE may be in one of these two downlink receiving states of WUS detection state and PDCCH detection state. If the UE is configured with the type B PDCCH detection, Type A PDCCH detection, the UE may be in one of these two downlink receiving states of Type B PDCCH detection state and Type A PDCCH detection state.

When the UE is configured with at least two downlink BWPs (e.g., downlink BWP-1 and downlink BWP-2) and there is only one active downlink BWP at a time, the active downlink BWP may be switched from Downlink BWP-1 to Downlink BWP-2.

Hereinafter, the method of determining the downlink receiving state on the new active downlink BWP to which switching is made will be described in two cases.

Case 1:

The previous active DL BWP (e.g., downlink BWP-1) and the new active downlink BWP to which switching is made (e.g., downlink BWP-2) of the UE are determined by one and the same carrier sensing as being idle or busy. That is, the previous active downlink BWP and the new active downlink BWP to which switching is made are both included within the bandwidth of one carrier sensing.

In this case, since the previous active downlink BWP (e.g., downlink BWP-1) and the new active downlink BWP to which switching is made (e.g., downlink BWP-2) of the UE are determined by the same carrier sensing as being idle or busy, the UE may keep the downlink receiving state on the previous active downlink BWP on the new active downlink BWP to which switching is made. For example, if the UE switches to the active downlink BWP-2 at time t, the downlink receiving state on the new active downlink BWP-2 to which switching is made by the UE at time t is the same as the downlink receiving state of the UE on BWP-1 at time t. For example, at time t, the downlink receiving state of the UE on BWP-1 is type B PDCCH detection state, then the downlink receiving state of the UE on BWP-2 is still type B PDCCH detection state, as shown in FIG. 6.

Case 2:

The previous active downlink BWP (e.g., downlink BWP-1) and the new active downlink BWP to which switching is made (e.g., downlink BWP-2) of the UE are determined by the respective separate carrier sensing as being idle or busy. That is, the previous active downlink BWP and the new active downlink BWP to which switching is made are not included within the bandwidth of one carrier sensing, but are included within respective bandwidths of their respective carrier sensing.

In this case, since the previous active downlink BWP (e.g., downlink BWP-1) and the new active downlink BWP to which switching is made (e.g., downlink BWP-2) of the UE are determined by the respective separate carrier sensing as being idle or busy, the carrier sensing result of the previous active downlink BWP (e.g., downlink BWP-1) and the carrier sensing result of the new active downlink BWP to which switching is made (e.g., downlink BWP-2) may be different.

In an exemplary embodiment, the UE may determine the downlink receiving state used on the new active downlink BWP to which switching is made according to indication information (e.g., common indication information) or physical layer signaling.

Alternatively, in another exemplary embodiment, the UE may determine the downlink receiving state used on the new active downlink BWP to which switching is made according to predefinition by protocol or higher layer signaling configuration. For example, the protocol may predefine that the downlink receiving state used by the UE on the new active downlink BWP to which switching is made is the WUS detection state, so the UE may determine that the downlink receiving state used on the new active downlink BWP to which switching is made is the WUS detection state according to the predefinition by protocol; or the protocol may predefine that the downlink receiving state used by the UE on the new active downlink BWP to which switching is made is the type B PDCCH detection state, so the UE may determine that the downlink receiving state used on the new active downlink BWP to which switching is made is the type B PDCCH detection state.

Alternatively, in yet another exemplary embodiment, in a case where the indication information or the physical layer signaling is received by the UE, the UE may determine the downlink receiving state used on the new active downlink BWP to which switching according to the indication information or the physical layer signaling; while in a case where the indication information or the physical layer signaling is not received by the UE, the UE may determine the downlink receiving state used on the new active downlink BWP to which switching according to the predefinition by protocol or the higher layer signaling configuration.

There are three active downlink BWP switching modes. The first mode is to trigger the active downlink BWP switching by the received DCI indication for scheduling the physical downlink shared channel (PDSCH), the second mode is to trigger the active downlink BWP switching by the received DCI indication for scheduling the physical uplink shared channel (PUSCH), and the third mode is to trigger the active downlink BWP switching by a timer. Hereinafter, how the UE determines the downlink receiving state used on the new active downlink BWP to which switching is made in step 401 in the three active downlink BWP switching modes will be described respectively.

Mode I: Active downlink BWP switching being triggered by an DCI indication for scheduling PDSCH In this manner, determining the downlink receiving state used on the new active downlink BWP to which switching is made in step 401 may further include one of:

Method I. 1:

The UE may determine the downlink receiving state used on the new active downlink BWP to which switching is made according to the predefinition by protocol or the higher layer signaling configuration.

For example, the protocol may predefine that the downlink receiving state used by the UE on the new active downlink BWP to which switching is made is the WUS detection state. The method is relatively simple and does not require additional signaling, but may not detect the PDCCH in time because the PDCCH can be detected only after the next WUS arrives on the new active downlink BWP to which switching is made.

In another example, the protocol may predefine that the downlink receiving state used by the UE on the new active downlink BWP to which switching is made is first the type A PDCCH detection state and then the WUS detection state. The value of the duration T of the type A PDCCH detection state may be predefined by the protocol, or the duration T of the type A PDCCH detection state may be configured by the higher layer signaling, or the duration T of the type A PDCCH detection state may be determined according to the maximum limited transmission time, as shown in FIG. 7. With this method, no additional signaling is required, and the detection of the PDCCH may be started relatively in time on the new active downlink BWP to which switching is made. The method assumes that the carrier sensing result of the new active BWP is idle if the UE wants to switch to the new active BWP, and the idle state of the carrier sensing result may last for a period of time. Therefore, the downlink receiving state first used by the UE on the new active BWP is the type A PDCCH detection state, and then the UE starts the WUS detection state when the idle state ends.

The time unit of the duration T of the type A PDCCH detection state may be determined according to the subcarrier spacing (SCS) of the new active downlink BWP to which switching is made. For example, the time unit of the duration T of the type A PDCCH detection state is one slot (or one OFDM symbol) of the new active downlink BWP to which switching is made. If the subcarrier spacing of the new active downlink BWP to which switching is made is 15 kHz, the time unit of the duration T of the type A PDCCH detection state is 1 ms. The time unit of the duration T of the type A PDCCH detection state may be determined according to a reference subcarrier spacing. For example, the time unit of the duration T of the type A PDCCH detection state is one slot, which is 1 ms, or one OFDM symbol, when the subcarrier spacing is 15 kHz.

The T value of the new active downlink BWP to which switching is made is independently determined according to the new active downlink BWP to which switching is made. For example, the T value of the new active downlink BWP to which switching is made is independently determined according to the subcarrier spacing of the new active downlink BWP to which switching is made. For example, the UE is configured with three downlink BWPs, which are BWP-1, BWP-2 and BWP-3 respectively, and the T value of the new active downlink BWP-1 to which switching is made is T1, and the T value of the new active downlink BWP-2 to which switching is made is T2, and the T value of the new active downlink BWP-3 to which switching is made is T3.

The T values of all the new active downlink BWPs to which switching is made in each serving cell are identical. For example, the UE is configured with three downlink BWPs, which are BWP-1, BWP-2 and BWP-3 respectively, and the T value of the new active downlink BWP-1 to which switching is made, the T value of the new active downlink BWP-2 to which switching is made and the T value of the new active downlink BWP-3 to which switching is made are identical.

Method I. 2:

The UE may determine the downlink receiving state used by the UE on the new active downlink BWP to which switching is made by receiving the physical layer signaling indication. The physical layer signaling may be a UE-specific physical layer signaling, for example, a signaling in UE-specific DCI for the UE scheduling the PDSCH; or may be a common physical layer signaling, for example, a signaling in group-common DCI.

For example, the UE may determine the downlink receiving state used by the UE on the new active downlink BWP to which switching is made by receiving the UE-specific physical layer signaling. For example, the UE may receive a field which indicates the downlink receiving state used by the UE on the new active downlink BWP to which switching is made (for example, the 2-bit indication field is used to indicate the downlink receiving state used by the UE on the new active downlink BWP to which switching is made, as shown in Table 1) in the DCI for triggering the active downlink BWP switching, in order to determine the downlink receiving state used by the UE on the new active downlink BWP to which switching is made. With this method, the UE can accurately select the appropriate downlink receiving state used on the new active downlink BWP to which switching is made, but the method requires an additional signaling indication. Table 1 shows a mapping table between indication field value and downlink receiving state used by UE on new active downlink BWP to which switching is made.

TABLE 1

| Indication Field Value | Downlink Receiving State |
| --- | --- |
| 00 | WUS Detection State |
| 01 | Type B PDCCH Detection |
| 10 | Type A PDCCH Detection with Duration T1, Then WUS Detection State |
| 11 | Type A PDCCH Detection with Duration T2, Then WUS Detection State |

In another exemplary embodiment, the UE may infer to determine the downlink receiving state used by the UE on the new active downlink BWP to which switching is made by receiving the common indication information. For example, the UE receives slot format information (SFI), and determines the downlink receiving state used by the UE on the new active downlink BWP to which switching is made. If the SFI indicates that the OFDM symbol is a downlink OFDM symbol, the downlink receiving state of this OFDM symbol is the type A PDCCH detection state; if the SFI indicates that the OFDM symbol is an unknown OFDM symbol, the downlink receiving state of the OFDM symbol is the WUS detection state. The time unit of the durations T1 and T2 of the type A PDCCH detection state may be determined according to the subcarrier spacing of the new active downlink BWP to which switching is made. For example, the time unit of the durations T1 and T2 of the type A PDCCH detection state is one slot (or one OFDM symbol) of the new active downlink BWP to which switching is made. If the subcarrier spacing of the new active downlink BWP to which switching is made is 15 kHz, the time unit of the durations T1 and T2 of the type A PDCCH detection state is 1 ms. The time unit of the durations T1 and T2 of the type A PDCCH detection state may be determined according to the reference subcarrier spacing. For example, the time unit of the durations T1 and T2 of the type A PDCCH detection state is one slot, which is 1 ms, or one OFDM symbol, when the subcarrier spacing is 15 kHz.

The T1 and T2 values of the new active downlink BWP to which switching is made are independently determined according to the new active downlink BWP to which switching is made. For example, the T1 and T2 values of the new active downlink BWP to which switching is made are independently determined based on the subcarrier spacing of the new active downlink BWP to which switching is made.

The T1 and T2 values of all the new active downlink BWPs to which switching is made in each serving cell are identical. For example, the UE is configured with three downlink BWPs, which are BWP-1, BWP-2 and BWP-3 respectively. The T1 and T2 values of the new active downlink BWP-1 to which switching is made, the T1 and T2 values of the new active downlink BWP-2 to which switching is made and the T1 and T2 values of the new active downlink BWP-3 to which switching is made are identical.

Method I. 3:

The UE may determine to use the WUS detection state and the PDCCH detection state at the same time according to e.g. predefinition by protocol. That is, the UE may perform the WUS detection and the PDCCH detection (type A PDCCH detection or Type B PDCCH detection, which may be determined, for example, by the higher layer signaling configuration) at the same time when switching to the new active downlink BWP. In this way, in a case where the UE does not know the situation of the carrier sensing on the new active downlink BWP to which switching is made, the WUS detection and the PDCCH detection would not be missed using this method, but the power consumption is relatively high.

Method I. 4:

If the UE receives the physical layer signaling or the common indication information, the UE may use Method I. 2 to determine the downlink receiving state used on the new active downlink BWP to which switching is made according to the received physical layer signaling or the common indication information;

If the UE does not receive the physical layer signaling and the common indication information, the UE may use Method I. 1 to determine the downlink receiving state used on the new active downlink BWP to which switching is made according to the predefinition by protocol or the higher layer signaling configuration; or, the UE may use Method I. 3 to determine that the WUS detection state and the PDCCH detection state (type A PDCCH detection, Type B PDCCH detection, which e.g. may be determined by the higher layer signaling configuration) are used simultaneously; or, the UE may determine to use Method I. 1 or Method I. 3 by receiving the higher layer signaling configuration, in order to determine the downlink receiving state used on the new active downlink BWP to which switching is made.

Mode II: Active downlink BWP switching being triggered by DCI indication for scheduling PUSCH For the transmission in the unlicensed bands, in order to reduce the interference to the WIFI system, the device cannot always occupy the channel. A maximum channel occupancy time is defined, which is called channel occupancy time (COT). For an unpaired spectrum, that is, one spectrum, there may be not only an uplink transmission (the UE transmits data, and the base station receives data), but also a downlink transmission (the base station transmits data, and the UE receives data). Within one COT, there may be both the downlink transmission and the uplink transmission, and the downlink transmission is followed by the uplink transmission. A switching point is located between the downlink transmission and the uplink transmission. There may be only one switching point in one COT, as shown in FIG. 8. There may be more than one switching point in one COT, as shown in FIG. 9. Within the unpaired spectrum, one uplink BWP and one downlink BWP form a BWP pair, and the switching of the uplink active BWP and the active downlink BWP in the active BWP pair are performed simultaneously, that is, the switching of the active BWP pair may be indicated by a field in the DCI for scheduling the PUSCH, and may also be indicated by a field in the DCI for scheduling the PDSCH. When the switching of the active downlink BWP is triggered by the DCI for scheduling the PUSCH, the downlink receiving state used by the UE on the new active downlink BWP to which switching is made is determined by methods as follows.

When there is only one switching point in the COT, the switching of the active downlink BWP is triggered by the DCI indication for triggering the PUSCH, and an uplink transmission is performed on the new active downlink BWP to which switching is made, then there would be no downlink transmission in the COT; the next COT starts from the WUS transmission; therefore, the UE starts from receiving the WUS on the new active downlink BWP to which switching is made, that is, the UE is in a state of receiving WUS on the new active downlink BWP to which switching is made. That is, in the case where there is only one switching point in the COT, the UE determines that the downlink receiving state used on the new active downlink BWP to which switching is made is the WUS detection state. As shown in FIG. 10, the PUSCH transmitted by the UE on the active BWP to which switching is made ends at time t2, and after the PUSCH ends, the UE starts receiving the WUS.

When there is more than one switching point in the COT, said determining the downlink receiving state used on the new active downlink BWP to which switching is made, in step 401 may further include one of:

Method II. 1:

The UE may determine the downlink receiving state used on the new active downlink BWP to which switching is made according to the predefinition by protocol or the higher layer signaling configuration.

For example, the protocol may predefine that the downlink receiving state used by the UE on the new active downlink BWP to which switching is made is the WUS detection state. The method is relatively simple and does not require additional signaling, but may not detect the PDCCH in time because the PDCCH can be detected only after the next WUS arrives on the new active downlink BWP to which switching is made.

In another example, the protocol may predefine that the downlink receiving state used by the UE on the new active downlink BWP to which switching is made is first the type A PDCCH detection state and then the WUS detection state. The value of the duration T of the type A PDCCH detection state may be predefined by the protocol, or the duration T of the type A PDCCH detection state may be configured by the higher layer signaling, or the duration T of the type A PDCCH detection state may be determined according to the maximum limited transmission time, as shown in FIG. 7. With this method, no additional signaling is required, and the detection of the PDCCH may be started relatively in time on the new active downlink BWP to which switching is made. The method assumes that the carrier sensing result of the new active BWP is idle if the UE wants to switch to the new active BWP, and the idle state of the carrier sensing result may last for a period of time. Therefore, the downlink receiving state first used by the UE on the new active BWP is the type A PDCCH detection state, and then the UE starts the WUS detection state when the idle state ends.

The time unit of the duration T of the type A PDCCH detection state may be determined according to the subcarrier spacing (SCS) of the new active downlink BWP to which switching is made. For example, the time unit of the duration T of the type A PDCCH detection state is one slot (or one OFDM symbol) of the active downlink BWP to which switching is made. If the subcarrier spacing of the new active downlink BWP to which switching is made is 15 kHz, the time unit of the duration T of the type A PDCCH detection state is 1 ms. The time unit of the duration T of the type A PDCCH detection state may be determined according to a reference subcarrier spacing. For example, the time unit of the duration T of the type A PDCCH detection state is one slot, which is 1 ms, or one OFDM symbol, when the subcarrier spacing is 15 kHz.

The T value of the new active downlink BWP to which switching is made is independently determined according to the new active downlink BWP to which switching is made. For example, the T value of the new active downlink BWP to which switching is made is independently determined according to the subcarrier spacing of the new active downlink BWP to which switching is made. For example, the UE is configured with three downlink BWPs, which are BWP-1, BWP-2 and BWP-3 respectively, and the T value of the new active downlink BWP-1 to which switching is made is T1, and the T value of the new active downlink BWP-2 to which switching is made is T2, and the T value of the new active downlink BWP-3 to which switching is made is T3.

The T values of all the new active downlink BWPs to which switching is made in each serving cell are identical. For example, the UE is configured with three downlink BWPs, which are BWP-1, BWP-2 and BWP-3 respectively, and the T value of the new active downlink BWP-1 to which switching is made, the T value of the new active downlink BWP-2 to which switching is made and the T value of the new active downlink BWP-3 to which switching is made are identical.

Method II. 2:

The UE may determine the downlink receiving state used by the UE on the new active downlink BWP to which switching is made by receiving the physical layer signaling indication. The physical layer signaling may be a UE-specific physical layer signaling, for example, a signaling in UE-specific DCI for the UE scheduling the PDSCH; or may be a common physical layer signaling, for example, a signaling in group-common DCI.

For example, the UE may determine the downlink receiving state used by the UE on the new active downlink BWP to which switching is made by receiving the UE-specific physical layer signaling. For example, the UE may receive a field which indicates the downlink receiving state used by the UE on the new active downlink BWP to which switching is made (for example, the 2-bit indication field is used to indicate the downlink receiving state used by the UE on the new active downlink BWP to which switching is made, as shown in the above Table 1) in the DCI for triggering the active downlink BWP switching, in order to determine the downlink receiving state used by the UE on the new active downlink BWP to which switching is made. With this method, the UE can accurately select the appropriate downlink receiving state used on the new active downlink BWP to which switching is made, but the method requires an additional signaling indication.

In another exemplary embodiment, the UE may infer to determine the downlink receiving state used by the UE on the new active downlink BWP to which switching is made by receiving the common indication information. For example, the UE receives SFI, and determines the downlink receiving state used by the UE on the new active downlink BWP to which switching is made. If the SFI indicates that the OFDM symbol is a downlink OFDM symbol, the downlink receiving state of this OFDM symbol is the type A PDCCH detection state; if the SFI indicates that the OFDM symbol is an unknown OFDM symbol, the downlink receiving state of the OFDM symbol is the WUS detection state. The time unit of the durations T1 and T2 of the type A PDCCH detection state may be determined according to the subcarrier spacing of the new active downlink BWP to which switching is made. For example, the time unit of the durations T1 and T2 of the type A PDCCH detection state is one slot (or one OFDM symbol) of the new active downlink BWP to which switching is made. If the subcarrier spacing of the new active downlink BWP to which switching is made is 15 kHz, the time unit of the durations T1 and T2 of the type A PDCCH detection state is 1 ms. The time unit of the durations T1 and T2 of the type A PDCCH detection state may be determined according to the reference subcarrier spacing. For example, the time unit of the durations T1 and T2 of the type A PDCCH detection state is one slot, which is 1 ms, or one OFDM symbol, when the subcarrier spacing is 15 kHz.

The T1 and T2 values of the new active downlink BWP to which switching is made are independently determined according to the new active downlink BWP to which switching is made. For example, the T1 and T2 values of the new active downlink BWP to which switching is made are independently determined based on the subcarrier spacing of the new active downlink BWP to which switching is made.

The T1 and T2 values of all the new active downlink BWPs to which switching is made in each serving cell are identical. For example, the UE is configured with three downlink BWPs, which are BWP-1, BWP-2 and BWP-3 respectively. The T1 and T2 values of the new active downlink BWP-1 to which switching is made, the T1 and T2 values of the new active downlink BWP-2 to which switching is made and the T1 and T2 values of the new active downlink BWP-3 to which switching is made are identical.

Method II. 3:

The UE may determine to use the WUS detection state and the PDCCH detection state at the same time according to e.g. predefinition by protocol. That is, the UE may perform the WUS detection and the PDCCH detection (type A PDCCH detection or Type B PDCCH detection, which may be determined, for example, by the higher layer signaling configuration) at the same time when switching to the new active downlink BWP. In this way, in a case where the UE does not know the situation of the carrier sensing on the new active downlink BWP to which switching is made, the WUS detection and the PDCCH detection would not be missed using this method, but the power consumption is relatively high.

Method II. 4:

If the UE receives the physical layer signaling or the common indication information, the UE may use Method II. 2 to determine the downlink receiving state used on the new active downlink BWP to which switching is made according to the received physical layer signaling or the common indication information;

If the UE does not receive the physical layer signaling and the common indication information, the UE may use Method II. 1 to determine the downlink receiving state used on the new active downlink BWP to which switching is made according to the predefinition by protocol or the higher layer signaling configuration; or, the UE may use Method II. 3 to determine that the WUS detection state and the PDCCH detection state (type A PDCCH detection, Type B PDCCH detection) are used simultaneously; or, the UE may determine to use Method II. 1 or Method II. 3 by receiving the higher layer signaling configuration, in order to determine the downlink receiving state used on the new active downlink BWP to which switching is made.

Mode III: Active downlink BWP switching being triggered by a timer

In this manner, determining the downlink receiving state used on the new active downlink BWP to which switching is made in step 401 may further include one of:

Method III. 1:

The UE may determine the downlink receiving state used on the new active downlink BWP to which switching is made according to the predefinition by protocol or the higher layer signaling configuration.

For example, the protocol may predefine that the downlink receiving state used by the UE on the new active downlink BWP to which switching is made is the WUS detection state. Since there is no direct signaling for triggering the active downlink BWP switching when the downlink triggered BWP switching is triggered by the timer, it is relatively appropriate to determine the downlink receiving state used by the UE on the new active downlink BWP to which switching is made to be the WUS detection state, because the active downlink BWP switching triggered by the timer is a backup active downlink BWP switching method.

Method III. 2:

The UE may determine the downlink receiving state used by the UE on the new active downlink BWP to which switching is made by receiving the common indication information.

For example, the UE receives the SFI to determine the downlink receiving state used by the UE on the new active downlink BWP to which switching is made. If the SFI indicates that the OFDM symbol is a downlink OFDM symbol, the downlink receiving state of the OFDM symbol is the type A PDCCH detection state. If the SFI indicates that the OFDM symbol is an unknown OFDM symbol, the downlink receiving state of the OFDM symbol is the WUS detection state.

Method III. 3:

The UE may determine to use the WUS detection state and the PDCCH detection state at the same time according to e.g. predefinition by protocol. That is, the UE may perform the WUS detection and the PDCCH detection (type A PDCCH detection or Type B PDCCH detection, which may be determined, for example, by the higher layer signaling configuration) at the same time when switching to the new active downlink BWP. In this way, in a case where the UE does not know the situation of the carrier sensing on the new active downlink BWP to which switching is made, the WUS detection and the PDCCH detection would not be missed using this method, but the power consumption is relatively high.

Method III. 4:

If the UE receives the common indication information, the UE may use Method III. 2 to determine the downlink receiving state used on the new active downlink BWP to which switching is made according to the received common indication information;

If the UE does not receive the common indication information, the UE may use Method III. 1 to determine the downlink receiving state used on the new active downlink BWP to which switching is made according to the predefinition by protocol or the higher layer signaling configuration; or, the UE may use Method III. 3 to determine that the WUS detection state and the PDCCH detection state (type A PDCCH detection, Type B PDCCH detection) are used simultaneously; or, the UE may determine to use Method III. 1 or Method III. 3 by receiving the higher layer signaling configuration, in order to determine the downlink receiving state used on the new active downlink BWP to which switching is made.

Hereinafter, how to determine the downlink receiving state used on the new active downlink BWP to which switching is made in step 401 in a case of the uplink and downlink transmission indicated by the DCI in the new active downlink BWP or active uplink BWP to which switching is made will be described.

The UE continues to perform the PDCCH detection (the type A PDCCH detection or Type B PDCCH detection) on a downlink slot (or a downlink OFDM symbol) indicated by the PDCCH (which may be the type A PDCCH or Type B PDCCH) for scheduling the PDSCH that is received on the new active downlink BWP to which switching is made, and detects WUS at a time indicated, by the PDCCH (which may be the type A PDCCH or Type B PDCCH) that does not schedule a PDSCH, as a downlink slot (or a downlink OFDM symbol). For example, at time t1, the UE switches from the active downlink BWP-1 to the active downlink BWP-2, and according to the predefinition by protocol, the UE performs the type A PDCCH detection in a period from time t1 to time (t1+T) (T is the duration of Type A PDCCH detection), and performs the WUS detection after time (t1+T). If a PDCCH is detected in the PDCCH detection between time t1 and time (t1+T), this PDCCH schedules a PDSCH at a time after time (t1+T). For example, the last OFDM symbol of the PDSCH scheduled by the PDCCH continues to time (t1+T+m), then the PDCCH detection is continued between time (t1+T) and time (t1+T+m), and the WUS detection is performed after time (t1+T+m), as shown in FIG. 11, or the WUS detection is performed after the slot where time (t1+T+m) is located ends. If no PDCCH is detected in the PDCCH detection between time t1 and time (t1+T), the WUS detection is performed after time (t1+T). This method may increase the chance of utilizing the downlink resources. That is because, the actual time available for transmitting the PDCCH on the new active downlink BWP to which switching is performed may exceed the time T predefine by the protocol; according to the predefinition by protocol, the UE can only perform the PDCCH detection within the time T in this COT, and cannot perform the PDCCH detection in the time exceeding the time T. With the above method, the UE may still receive the PDCCH in the time exceeding the time T.

The UE receives, on the new active downlink BWP to which switching is made, an uplink slot (or an uplink OFDM symbol) indicated by the PDCCH (which may be the type A PDCCH or Type B PDCCH) for scheduling the PDSCH, and starts the WUS detection at the end of the scheduled PUSCH. The UE detects WUS at a time indicated, by the PDCCH (which may be the type A PDCCH or Type B PDCCH) that does not schedule a PDSCH, as an uplink slot (or an uplink OFDM symbol). For example, at time t1, the UE switches from the active downlink BWP-1 to the active downlink BWP-2, and according to the predefinition by protocol, the UE performs the type A PDCCH detection in a period from time t1 to time (t1+T) (T is the duration of Type A PDCCH detection), and performs the WUS detection after time (t1+T). If a PDCCH is detected in the PDCCH detection between time t1 and time (t1+T), this PDCCH schedules a PUSCH at a time after time (t1+T). For example, the last OFDM symbol of the PUSCH scheduled by the PDCCH continues to time (t1+T+m), then the WUS detection is performed after time (t1+T+m), but not performed after time (t1+T), as shown in FIG. 12; or the WUS detection is performed after the slot where time (t1+T+m) is located ends. If no PDCCH is detected in the PDCCH detection between time t1 and time (t1+T), the WUS detection is performed after time (t1+T). This method may reduce unnecessary WUS detection, since the WUS may not be transmitted until one COT ends.

In order to ensure that the complexity of the UE is not too large, the number of PDCCH detections of each UE should be limited. For a serving cell, the maximum number of PDCCHs of different sizes detected by the UE in each slot is dependent on the subcarrier spacing configuration (μ) of PDCCH. In particular, a correspondence between the maximum number of PDCCHs of different sizes $M_{PDCCH}^{max,slot,\mu}$ detected in each slot of each serving cell and the subcarrier spacing (μ) of PDCCH is as shown in Table 2. Table 2 shows correspondence between maximum number of PDCCHs of different sizes detected in each slot of each serving cell and subcarrier spacing configuration (μ) Of PDCCH.

TABLE 2

| μ | $M_{PDCCH}^{max,slot,\mu}$ |
|---|---|
| 0 | 44 |
| 1 | 36 |
| 2 | 22 |
| 3 | 20 |

In addition, the number of non-overlapping CCEs detected by the UE should also be limited. For a serving cell, the maximum number of non-overlapping CCEs detected by the UE in each slot is dependent on the subcarrier spacing configuration (μ) of PDCCH. In particular, a correspondence between the maximum number of non-overlapping CCEs $C_{PDCCH}^{max,slot,\mu}$ detected in each slot of each serving cell and the subcarrier spacing configuration (μ) of PDCCH is as shown in Table 3. Table 3 shows correspondence between maximum number of non-overlapping CCEs detected in each slot of each serving cell and subcarrier spacing configuration (μ) Of PDCCH.

TABLE 3

| μ | $C_{PDCCH}^{max,slot,\mu}$ |
|---|---|
| 0 | 56 |
| 1 | 56 |
| 2 | 48 |
| 3 | 32 |

The maximum number of PDCCHs detected by the UE and the maximum number of non-overlapping CCEs detected by the UE are determined for the case where the UE is configured with one serving cell.

In a case where the UE is configured with CA or DC, a CA or DC capability of the UE supports up to a predetermined number of (for example, 4) downlink serving cells, and the UE is configured with the predetermined number of downlink serving cells or less, the maximum number of detections of PDCCHs of different sizes $M_{PDCCH}^{max,slot,\mu}$ and the maximum number of detections of non-overlapping CCEs $C_{PDCCH}^{max,slot,\mu}$ of the UE in each slot of each downlink serving cell are determined respectively according to the subcarrier spacing configuration μ of each downlink serving cell, i.e., determined respectively according to the predefined correspondences between the subcarrier spacing configuration μ and $M_{PDCCH}^{max,slot,\mu}$, $C_{PDCCH}^{max,slot,\mu}$ of each downlink serving cell as given in the above Table 2 and Table 3, which are $M_{PDCCH}^{max,slot,\mu}$ and $C_{PDCCH}^{max,slot,\mu}$ respectively.

In a case where the UE is configured with CA or DC, the CA or DC capability of the UE supports more than a predetermined number (for example, 4) of downlink serving cells, the UE indicates by using a parameter (for example, pdcch-BlindDetectionCA) that the UE's capability of detecting the PDCCH is $N_{cells}^{cap}$ downlink serving cells ($N_{cells}^{cap}$ is greater than or equal to a predetermined number, for example, 4), and the UE is configured with $N_{cells}^{DL,\mu}$ downlink serving cells whose subcarrier spacing configuration is μ, a sum $M_{PDCCH}^{total,\mu}$ of respective maximum numbers of detections of PDCCHs of different sizes of the UE in each slot of $N_{cells}^{DL,\mu}$ serving cells with the subcarrier spacing configuration μ is $$M_{PDCCH}^{total,\mu} = \min\left\{N_{cells}^{DL,\mu} \cdot M_{PDCCH}^{max,slot,\mu}, \left\lfloor N_{cells}^{cap} \cdot M_{PDCCH}^{max,slot,\mu} \cdot N_{cells}^{DL,\mu} / \sum_{\mu=0}^{3} N_{cells}^{DL,\mu} \right\rfloor\right\},$$

and a sum $C_{PDCCH}^{max,slot,\mu}$ of respective maximum numbers of detections of non-overlapping CCEs in each slot of $N_{cells}^{DL,\mu}$ serving cells with the subcarrier spacing configuration is $$C_{PDCCH}^{total,\mu} = \min\left\{N_{cells}^{DL,\mu} \cdot C_{PDCCH}^{max,slot,\mu}, \left\lfloor N_{cells}^{cap} \cdot C_{PDCCH}^{max,slot,\mu} \cdot N_{cells}^{DL,\mu} / \sum_{\mu=0}^{3} N_{cells}^{DL,\mu} \right\rfloor\right\}.$$

The above description is related to the method of determining the maximum number of detections of PDCCHs and the maximum number of detections of non-overlapping CCEs in the case where only one downlink BWP is configured for each serving cell, or there is only one active downlink BWP at a time although a plurality of downlink BWPs are configured for each serving cell, and the configured subcarrier spacing configurations of the plurality of downlink BWPs are the same.

According to the present disclosure, there is proposed a method for performing PDCCH detection in a case where at least one of serving cells configured for a UE is configured with a plurality of downlink BWPs.

A flowchart of a method for performing PDCCH detection performed at a UE according to an exemplary embodiment of the present disclosure will be specifically described below with reference to FIG. 13.

FIG. 13 schematically illustrates a flowchart of a method 1300 for PDCCH detection performed at a UE according to an exemplary embodiment of the present disclosure.

Referring to FIG. 13, in Step 1301, in which in a case where at least one of the serving cells configured for the UE is configured with a plurality of downlink BWPs, the UE determines the number of PDCCH detections of each serving cell. In step 1303, the UE performs the PDCCH detection according to the determined number of PDCCH detections.

Hereinafter, how the UE determines the number of PDCCH detections of each serving cell in the case where at least one of the serving cells configured for the UE is configured with a plurality of downlink BWPs in step 1301 will be described.

In step 1301, if at least one downlink serving cell configured by the UE is configured with a plurality of downlink BWPs, and the subcarrier spacing configurations of the configured plurality of downlink BWPs are not exactly identical, it is assumed that the serving cell configured with the plurality of downlink BWPs has only one active downlink BWP at any time, and the active downlink BWP may be switched by the DCI indication between the plurality of downlink BWPs configured by the UE in the serving cell, then the method for performing the PDCCH detection according to the present disclosure may be used to determine the number of PDCCH detections and the number of detections of non-overlapping CCEs.

Specifically, in a case where the UE is configured with a CA or a DC, and the CA or DC capability of the UE supports up to a predetermined number of (for example, 4) downlink serving cells, and the UE is configured with the predetermined number of serving cells or less, wherein subcarrier spacing configurations of the plurality of downlink BWPs with which the at least one serving cell is configured are not exactly identical, the step 1301 may further include:

the UE determining, according to the predefined correspondences between the subcarrier spacing configuration μ of each downlink serving cell and the maximum number of detections of PDCCHs of different sizes $M_{PDCCH}^{max,slot,\mu}$ and the maximum number of detections of non-overlapping CCEs $C_{PDCCH}^{max,slot,\mu}$ in each slot of each serving cell as given in the above Table 2 and Table 3, the maximum number of PDCCHs of different sizes $M_{PDCCH}^{max,slot,\mu}$ and the maximum number of non-overlapping CCEs $C_{PDCCH}^{max,slot,\mu}$ detected by the UE in each slot of each serving cell, respectively;

the UE determining the number of PDCCH detections of each serving cell of the UE by considering both the maximum number of detections of PDCCHs $M_{PDCCH}^{max,slot,\mu}$ and the maximum number of detections of CCEs $C_{PDCCH}^{max,slot,\mu}$.

In a case where the UE is configured with CA or DC, the CA or DC capability of the UE supports more than a predetermined number (for example, 4) of downlink serving cells, the UE indicates by using a parameter (for example, pdcch-BlindDetectionCA) that the UE's capability of detecting the PDCCH is $N_{cells}^{cap}$ downlink serving cells ($N_{cells}^{cap}$ is greater than or equal to a predetermined number, for example, 4), and the UE is configured with a total of $N_{cells}^{DL}$ downlink serving cells in which at least one of the downlink serving cells is configured with a plurality of downlink BWPs and subcarrier spacing configurations of the configured plurality of downlink BWPs are not exactly identical, step 1301 of determining the number of PDCCH detections and the number of non-overlapping CCEs may be performed according to methods as follows.

Method One: If the UE is configured with CA or DC, the CA or DC capability of the UE supports more than a predetermined number of serving cells, and the UE is configured with more than the predetermined number of serving cells, wherein the subcarrier spacing configurations of the plurality of downlink BWPs of the at least one serving cell are not exactly identical, step 1301 may further include:

setting a maximum number of detections of PDCCHs of different sizes $M_{PDCCH}^{\mu}$ of the UE in each slot in the active downlink BWP of each serving cell with a subcarrier spacing configuration as $M_{PDCCH}^{\mu} = \min\{M_{PDCCH}^{max,slot,\mu}, \lfloor N_{cells}^{cap} * M_{PDCCH}^{max,slot,\mu} / N_{cells}^{DL} \rfloor\}$, and setting a maximum number of detections of non-overlapping Control Channel Element 'CCE' $C_{PDCCH}^{\mu}$ of the UE in each slot in the active downlink BWP of each serving cell with the subcarrier spacing configuration as $C_{PDCCH}^{\mu} = \min\{C_{PDCCH}^{max,slot,\mu}, \lfloor N_{cells}^{cap} * C_{PDCCH}^{max,slot,\mu} / N_{cells}^{DL} \rfloor\}$, where $M_{PDCCH}^{max,slot,\mu}$ represents a maximum number of PDCCHs of different sizes detected in each slot of each serving cell with the subcarrier spacing configuration μ, $C_{PDCCH}^{max,slot,\mu}$ represents a maximum number of non-overlapping CCEs detected in each slot of each serving cell with the subcarrier spacing configuration μ, $N_{cells}^{cap}$ represents a number of serving cells for which the PDCCHs can be detected by the UE, which is indicated by a parameter, $N_{cells}^{DL,\mu}$ represents a number of serving cells with the subcarrier spacing configuration which are configured for the UE, and $\lfloor \ldots \rfloor$ represents a flooring operation; and determining the number of detections of PDCCHs of each serving cell for the UE by considering both the maximum number of detections of PDCCHs $M_{PDCCH}^{\mu}$ and the maximum number of detections of CCEs $C_{PDCCH}^{\mu}$.

With this method, the problem may be avoid that the maximum number of detections of PDCCHs and the maximum number of detections of CCEs between the base station and the UE are inconsistent due to the error in the indication of the active downlink BWP switching.

In the prior art, assuming that the subcarrier spacing configuration of the active downlink BWP of the serving cell is $\mu$, a sum $M_{PDDCH}^{total,\mu}$ of respective maximum numbers of detections of PDCCHs of different sizes of the UE in each slot of $N_{cells}^{DL,\mu}$ serving cells whose subcarrier spacing configuration of the active downlink BWP is $\mu$ is $$M_{PDCCH}^{total,\mu} = \min\left\{N_{cells}^{DL,\mu} \cdot M_{PDCCH}^{max,slot,\mu}, \left\lfloor N_{cells}^{cap} \cdot M_{PDCCH}^{max,slot,\mu} \cdot N_{cells}^{DL,\mu} / \sum_{\mu=0}^{3} N_{cells}^{DL,\mu} \right\rfloor\right\},$$

and a sum $C_{PDCCH}^{total,\mu}$ of respective maximum numbers of detections of non-overlapping CCEs in each slot of $N_{cells}^{DL,\mu}$ serving cells whose subcarrier spacing configuration of the active downlink BWP is $\mu$ is $$C_{PDCCH}^{total,\mu} = \min\left\{N_{cells}^{DL,\mu} \cdot C_{PDCCH}^{max,slot,\mu}, \left\lfloor N_{cells}^{cap} \cdot C_{PDCCH}^{max,slot,\mu} \cdot N_{cells}^{DL,\mu} / \sum_{\mu=0}^{3} N_{cells}^{DL,\mu} \right\rfloor\right\},$$

then different understandings on the subcarrier spacing configuration of the active downlink BWP between the UE and the base station may occur since the UE does not receive the active downlink BWP switching indication signalling of the DCI, which may cause different understanding on the maximum number of detections of PDCCHs of different sizes and the maximum number of non-overlapping CCEs in each slot of other serving cells between the UE and the base station.

According to the present disclosure, a reference subcarrier spacing configuration $\mu_{ref}$ may be determined for a serving cell with which a plurality of downlink BWPs are configured and whose subcarrier spacing configurations of the configured plurality of downlink BWPs are not exactly identical, as the subcarrier spacing configuration of this serving cell, in order to determine the number of PDCCH detections and the number of detections of non-overlapping CCEs. The reference subcarrier spacing configuration may be the largest one of the subcarrier spacing configurations $\mu$ of the plurality of downlink BWPs configured in the serving cell, and may also be the smallest one of the subcarrier spacing configurations $\mu$ of the plurality of downlink BWPs configured in the serving cell. For example, the UE is configured with 2 downlink BWPs in the serving cell s, namely BWP-1 and BWP-2, the subcarrier spacing configuration $\mu 1$ of BWP-1 is equal to 0, and the subcarrier spacing configuration $\mu 2$ of BWP-2 is equal to 1, then the subcarrier spacing configuration 2 of BWP-2 is used as the reference subcarrier spacing configuration of the serving cell s to determine the number of PDCCH detections and the number of detections of non-overlapping CCEs.

Therefore, according to Method Two: if the UE is configured with CA or DC, the CA or DC capability of the UE supports more than a predetermined number of serving cells, and the UE is configured with more than the predetermined number of serving cells, wherein the subcarrier spacing configurations of the plurality of downlink BWPs with which the at least one serving cell is configured is not exactly identical, step 1301 may further include:

determining, for the at least one serving cell configured with a plurality of downlink BWPs, a reference subcarrier spacing configuration $\mu_{ref}$ as a subcarrier spacing configuration of the at least one serving cell, wherein subcarrier spacing configurations of the configured downlink BWPs are not exactly identical;

according to the determined reference subcarrier spacing configuration $\mu_{ref}$, setting a sum $M_{PDCCH}^{total,slot,\mu_{ref}}$ of respective maximum numbers of detections of PDCCHs of PDCCH different sizes of the UE in each slot of $N_{cells}^{DL,\mu_{ref}}$ serving cells with the subcarrier spacing configuration re as $$M_{PDCCH}^{total,slot,\mu_{ref}} = \min\left\{N_{cells}^{DL,\mu_{ref}} \times M_{PDCCH}^{max,slot,\mu_{ref}}, \left\lfloor \frac{N_{cells}^{cap} \times M_{PDCCH}^{max,slot,\mu_{ref}} \times N_{cells}^{DL,\mu_{ref}}}{\sum_{\mu=0}^{3} N_{cells}^{DL,\mu_{ref}}} \right\rfloor\right\},$$

and setting a sum $C_{PDCCH}^{total,slot,\mu_{ref}}$ of respective maximum numbers of detections of non-overlapping CCEs in each slot of $N_{cells}^{DL,\mu_{ref}}$ serving cells with the subcarrier spacing cells $$C_{PDCCH}^{total,slot,\mu_{ref}} = \min\left\{N_{cells}^{DL,\mu_{ref}} \times C_{PDCCH}^{max,slot,\mu_{ref}}, \left\lfloor \frac{N_{cells}^{cap} \times C_{PDCCH}^{max,slot,\mu_{ref}} \times N_{cells}^{DL,\mu_{ref}}}{\sum_{\mu=0}^{3} N_{cells}^{DL,\mu_{ref}}} \right\rfloor\right\},$$

where $N_{cells}^{DL,\mu_{ref}}$ represents a number of serving cells with the reference subcarrier spacing configuration $\mu_{ref}$ which are configured for the UE, $M_{PDCCH}^{max,slot,\mu_{ref}}$ represents a maximum number of PDCCHs of different sizes detected in each slot of each serving cell with the reference subcarrier spacing configuration $\mu_{ref}$, $C_{PDCCH}^{max,slot,\mu_{ref}}$ represents a maximum number of non-overlapping CCEs detected in each slot of each serving cell with the reference subcarrier spacing configuration $\mu_{ref}$, $N_{cells}^{cap}$ represents a number of serving cells for which the PDCCHs can be detected by the UE, which is indicated by a parameter, $N_{cells}^{DL,\mu_{ref}}$ represents a number of serving cells with the reference subcarrier spacing configuration $\mu_{ref}$ which are configured for the UE, and $\lfloor \ldots \rfloor$ represents a flooring operation;

calculating a maximum number of PDCCH detections of each serving cell for the UE according to $M_{PDCCH}^{total,slot,\mu_{ref}}$, and calculating a maximum number of detections of CCEs of each serving cell for the UE according to $C_{PDCCH}^{total,slot,\mu_{ref}}$;

For example, it may be calculated as follows:

the maximum number of PDCCH detections of each of $(M_{PDCCH}^{total,slot,\mu_{ref}}) \mod (N_{cells}^{DL,\mu_{ref}})$ serving cells is $M_{PDCCH}^{\mu_{ref}} = \lfloor M_{PDCCH}^{total,slot,\mu_{ref}} / N_{cells}^{DL,\mu_{ref}} \rfloor + 1$, while the maximum number of PDCCH detections of each of $N_{cells}^{DL,\mu_{ref}} - (M_{PDCCH}^{total,slot,\mu_{ref}}) \mod (N_{cells}^{DL,\mu_{ref}})$ serving cell is $M_{PDCCH}^{\mu_{ref}} = \lfloor M_{PDCCH}^{total,slot,\mu_{ref}} / N_{cells}^{DL,\mu_{ref}} \rfloor$;

the maximum number of CCE detections of each of $(C_{PDCCH}^{total,slot,\mu_{ref}}) \mod (N_{cells}^{DL,\mu_{ref}})$ serving cells is $C_{PDCCH}^{\mu_{ref}} = \lfloor C_{PDCCH}^{total,slot,\mu_{ref}} / N_{cells}^{DL,\mu_{ref}} \rfloor + 1$, while the maximum number of CCE detections of each of $N_{cells}^{DL,\mu_{ref}} - (C_{PDCCH}^{total,slot,\mu_{ref}}) \mod (N_{cells}^{DL,\mu_{ref}})$ serving cell is $C_{PDCCH}^{\mu_{ref}} = \lfloor C_{PDCCH}^{total,slot,\mu_{ref}} / N_{cells}^{DL,\mu_{ref}} \rfloor$.

The at least one serving cell with which the plurality of downlink BWPs are configured and whose sub-carrier spacing configurations of the configured downlink BWPs are not exactly identical, when the reference subcarrier spacing configuration $\mu_{ref}$ is the same as the subcarrier spacing configuration of the active downlink BWP of the serving cell, the maximum number of PDCCH detections of the serving cell and the maximum number of CCE detections of the serving cell are calculated by the above method. When the reference subcarrier spacing configuration $\mu_{ref}$ is different from the subcarrier spacing configuration of the active downlink BWP of the serving cell, the maximum number of PDCCH detections of the serving cell is $$M_{PDCCH}^{\mu_{active}} = \left\lfloor \frac{M_{PDCCH}^{\mu_{ref}}}{M_{PDCCH}^{max,slot,\mu_{ref}}} * M_{PDCCH}^{max,slot,\mu_{active}} \right\rfloor,$$

and the maximum number of CCE detections of the serving cell is $$C_{PDCCH}^{\mu_{active}} = \left\lfloor \frac{C_{PDCCH}^{\mu_{ref}}}{C_{PDCCH}^{max,slot,\mu_{ref}}} * C_{PDCCH}^{max,slot,\mu_{active}} \right\rfloor,$$

where $\mu_{active}$ is the subcarrier spacing configuration of the active downlink BWP of the serving cell.

It should be understood that the above calculations are only illustrative but not limiting, and the disclosure is not limited thereto.

Next, the number of PDCCH detections of each serving cell for the UE may be determined by considering both the calculated maximum number of PDCCH detections and maximum number of detections of CCEs of each serving cell for the UE.

In this method, the UE may determine the maximum number of PDCCH detections and the maximum number of CCE detections according to the reference subcarrier spacing configuration of each serving cell, and would not cause different understandings on the maximum number of detections of PDCCHs of different sizes and the maximum number of non-overlapping CCEs in each slot of other serving cells between the UE and the base station due to different understandings on the subcarrier spacing configuration of the active downlink BWP between the UE and the base station.

The structure of the UE according to an embodiment of the present disclosure will be described below with reference to FIG. 14. FIG. 14 schematically shows a schematic structure diagram of a UE 1400 according to an embodiment of the present disclosure. The UE 1400 may be used to perform the method 400 described with reference to FIG. 4, or the method 1400 described with reference to FIG. 13.

As shown in FIG. 14, the UE 1400 includes a processing unit or processor 1410, which may be a single unit or a combination of multiple units for performing different steps of the method; a memory 1103 in which computer executable instructions are stored, the instructions, when executed by the processor 1420, cause the UE 1400 to perform the method 400 or method 1400. For the sake of brevity, only the schematic structure of the UE according to an exemplary embodiment of the present disclosure will be described herein, and details which have been described previously in the method 400 with reference to FIG. 4 or the method 1400 with reference to FIG. 13 will be omitted.

In an exemplary embodiment in which the instructions, when executed by the processor 1410, cause the UE 1400 to perform the method 400, the instructions cause the UE 1400 to:

determine a downlink receiving state on an active downlink BWP to which switching is made; and perform downlink reception according to the determined downlink receiving state on the active downlink BWP to which switching is made.

In an exemplary embodiment, said determining the downlink receiving state on the active downlink BWP to which switching is made includes:

using, by a User Equipment 'UE', a downlink receiving state on a previous active downlink BWP on the active downlink BWP to which switching is made, if the previous active downlink BWP and the active downlink BWP to which switching is made are determined by one and the same carrier sensing as being idle or busy.

In an exemplary embodiment, said determining the downlink receiving state on the active downlink BWP to which switching is made includes:

determining, by a UE, the downlink receiving state on the active downlink BWP to which switching is made according to indication information (e.g. common indication information) or physical layer signaling, or according to predefinition by protocol or higher layer signaling configuration, if a previous active downlink BWP and the active downlink BWP to which switching is made are determined by respective separate carrier sensing as being idle or busy.

Alternatively, the UE may determine, according to the predefinition by protocol or the higher layer signaling configuration, the downlink receiving state used on the active downlink BWP to which switching is made.

Alternatively, the UE may determine, according to the indication information or the physical layer signaling, the downlink receiving state used on the new active downlink BWP to which switching is made, when receiving the indication information or the physical layer signaling; and determine, according to the predefinition by protocol or the higher layer signaling configuration, the downlink receiving state used on the new active downlink BWP to which switching is made, when not receiving the indication information or the physical layer signaling.

In an exemplary embodiment, the instructions, when executed by the processor 1410, cause the UE 1400 to trigger switching of the active downlink BWP by DCI for scheduling a downlink data channel (Mode I).

In this manner, determining the downlink receiving state used on the new active downlink BWP to which switching is made in step 401 may further include one of:

Method I. 1:

The UE may determine the downlink receiving state used on the new active downlink BWP to which switching is made according to the predefinition by protocol or the higher layer signaling configuration.

Method I. 2:

The UE may determine the downlink receiving state used by the UE on the new active downlink BWP to which switching is made by receiving the physical layer signaling indication.

Method I. 3:

The UE may determine to use the WUS detection state and the PDCCH detection state at the same time Method I. 4:

If the UE receives the physical layer signaling or the common indication information, the UE may use Method I. 2 to determine the downlink receiving state used on the new active downlink BWP to which switching is made according to the received physical layer signaling or the common indication information;

If the UE does not receive the physical layer signaling and the common indication information, the UE may use Method I. 1 to determine the downlink receiving state used on the new active downlink BWP to which switching is made according to the predefinition by protocol or the higher layer signaling configuration; or, the UE may use Method I. 3 to determine that the WUS detection state and the PDCCH detection state (type A PDCCH detection, Type B PDCCH detection) are used simultaneously; or, the UE may determine to use Method I. 1 or Method I. 3 by receiving the higher layer signaling configuration, in order to determine the downlink receiving state used on the new active downlink BWP to which switching is made.

In an exemplary embodiment, the instructions, when executed by the processor 1410, cause the UE 1400 to trigger switching of the active downlink BWP by DCI for scheduling PUSCH (Mode II).

In a case where there is only one switching point between the downlink transmission and the uplink transmission in the COT, the UE determines that the downlink receiving state used on the new active downlink BWP to which switching is made is the WUS detection state.

In a case where there is more than one switching point between the downlink transmission and the uplink transmission in the COT, determining the downlink receiving state on the new active downlink BWP to which switching is made includes one of:

Method II. 1:
The UE may determine the downlink receiving state used on the new active downlink BWP to which switching is made according to the predefinition by protocol or the higher layer signaling configuration.

Method II. 2:
The UE may determine the downlink receiving state used by the UE on the new active downlink BWP to which switching is made by receiving the physical layer signaling indication.

Method II. 3:
The UE may determine to use the WUS detection state and the PDCCH detection state at the same time.

Method II. 4:
If the UE receives the physical layer signaling or the common indication information, the UE may use Method II. 2 to determine the downlink receiving state used on the new active downlink BWP to which switching is made according to the received physical layer signaling or the common indication information;

If the UE does not receive the physical layer signaling and the common indication information, the UE may use Method II. 1 to determine the downlink receiving state used on the new active downlink BWP to which switching is made according to the predefinition by protocol or the higher layer signaling configuration; or, the UE may use Method II. 3 to determine that the WUS detection state and the PDCCH detection state (type A PDCCH detection, Type B PDCCH detection) are used simultaneously; or, the UE may determine to use Method II. 1 or Method II. 3 by receiving the higher layer signaling configuration, in order to determine the downlink receiving state used on the new active downlink BWP to which switching is made.

In an exemplary embodiment, the instructions, when executed by the processor 1410, cause the UE 1400 to trigger switching of the active downlink BWP by a timer (Mode III).

In this manner, determining the downlink receiving state used on the new active downlink BWP to which switching is made may further include one of:

Method III. 1:
The UE may determine the downlink receiving state used on the new active downlink BWP to which switching is made according to the predefinition by protocol or the higher layer signaling configuration.

Method III. 2:
The UE may determine the downlink receiving state used by the UE on the new active downlink BWP to which switching is made by receiving the common indication information.

Method III. 3:
The UE may determine to use the WUS detection state and the PDCCH detection state at the same time.

Method III. 4:
If the UE receives the common indication information, the UE may use Method III. 2 to determine the downlink receiving state used on the new active downlink BWP to which switching is made according to the received common indication information;

If the UE does not receive the common indication information, the UE may use Method III. 1 to determine the downlink receiving state used on the new active downlink BWP to which switching is made according to the predefinition by protocol or the higher layer signaling configuration; or, the UE may use Method III. 3 to determine that the WUS detection state and the PDCCH detection state (type A PDCCH detection, Type B PDCCH detection) are used simultaneously; or, the UE may determine to use Method III. 1 or Method III. 3 by receiving the higher layer signaling configuration, in order to determine the downlink receiving state used on the new active downlink BWP to which switching is made.

In an exemplary embodiment in which the instructions, when executed by the processor 1410, cause the UE 1400 to perform the method 1400, the instructions cause the UE 1400 to:

determine, in a case where at least one of the serving cells configured for the UE is configured with a plurality of downlink BWPs, the number of PDCCH detections of each serving cell;

perform the PDCCH detection according to the determined number of PDCCH detections.

Determining the number of detections of the PDCCH for each serving cell of the UE in a case where a plurality of downlink BWPs are configured for at least one of the serving cells configured for the UE;

PDCCH detection is performed according to the determined number of detections of the PDCCH.

If the UE is configured with CA or DC, the CA or DC capability of the UE supports more than a predetermined number of serving cells, and the UE is configured with more than the predetermined number of serving cells, wherein the sub-carrier spacing configurations of the plurality of downlink BWPs of the at least one serving cell are not exactly identical, said determining the number of PDCCH detections of each serving cell further includes:

setting a maximum number of detections of PDCCHs of different sizes $M_{PDCCH}^{\mu}$ of the UE in each slot in the active downlink BWP of each serving cell with a subcarrier spacing configuration $\mu$ as $$M_{PDCCH}^{\mu} = \min\{M_{PDCCH}^{max,slot,\mu} \lfloor N_{cells}^{cap} * M_{PDCCH}^{max,slot,\mu} / N_{cells}^{DL} \rfloor\},$$

and setting a maximum number of detections of non-overlapping Control Channel Element 'CCE' $C_{PDCCH}^{\mu}$ of the UE in each slot in the active downlink BWP of each serving cell with the subcarrier spacing configuration μ as $$C_{PDCCH}^{\mu}=\min\{C_{PDCCH}^{max,slot,\mu}\lfloor N_{cells}^{cap} * C_{PDCCH}^{max,slot,\mu}/N_{cells}^{DL}\rfloor\},$$

where $M_{PDCCH}^{max,slot,\mu}$ represents a maximum number of PDCCHs of different sizes detected in each slot of each serving cell with the subcarrier spacing configuration μ, $C_{PDCCH}^{max,slot,\mu}$ represents a maximum number of non-overlapping CCEs detected in each slot of each serving cell with the subcarrier spacing configuration μ, $N_{cells}^{cap}$ represents a number of serving cells for which the PDCCHs can be detected by the UE, which is indicated by a parameter, $N_{cells}^{DL,\mu}$ is represents a number of serving cells with the subcarrier spacing configuration which are configured for the UE, and $\lfloor \ldots \rfloor$ represents a flooring operation; and determining the number of detections of PDCCHs of each serving cell for the UE by considering both the maximum number of detections of PDCCHs $M_{PDCCH}^{\mu}$ and the maximum number of detections of CCEs $C_{PDCCH}^{\mu}$.

If the UE is configured with CA or DC, the CA or DC capability of the UE supports more than a predetermined number of serving cells, and the UE is configured with more than the predetermined number of serving cells, wherein the subcarrier spacing configurations of the plurality of downlink BWPs with which the at least one serving cell is configured is not exactly identical, said determining the number of PDCCH detections of each serving cell further includes:

determining, for the at least one serving cell configured with a plurality of downlink BWPs, a reference subcarrier spacing configuration $\mu_{ref}$ as a subcarrier spacing configuration of the at least one serving cell, wherein subcarrier spacing configurations of the configured downlink BWPs are not exactly identical;

according to the determined reference subcarrier spacing configuration $\mu_{ref}$, setting a sum $M_{PDCCH}^{total,slot,\mu_{ref}}$ of respective maximum numbers of detections of PDCCHs of different sizes of the UE in each slot of $N_{cells}^{DL,\mu_{ref}}$ serving cells with the subcarrier spacing configuration $\mu_{ref}$ as $$M_{PDCCH}^{total,slot,\mu_{ref}} = \min\left\{N_{cells}^{DL,\mu_{ref}} \times M_{PDCCH}^{max,slot,\mu_{ref}}, \left\lfloor \frac{N_{cells}^{cap} \times M_{PDCCH}^{max,slot,\mu_{ref}} \times N_{cells}^{DL,\mu_{ref}}}{\sum_{\mu=0}^{3} N_{cells}^{DL,\mu_{ref}}} \right\rfloor \right\},$$

and setting a sum $C_{PDCCH}^{total,slot,\mu_{ref}}$ of respective maximum numbers of detections of non-overlapping CCEs in each slot of $N_{cells}^{DL,\mu_{ref}}$ serving cells with the subcarrier spacing configuration $\mu_{ref}$ as $$C_{PDCCH}^{total,slot,\mu_{ref}} = \min\left\{N_{cells}^{DL,\mu_{ref}} \times C_{PDCCH}^{max,slot,\mu_{ref}}, \left\lfloor \frac{N_{cells}^{cap} \times C_{PDCCH}^{max,slot,\mu_{ref}} \times N_{cells}^{DL,\mu_{ref}}}{\sum_{\mu=0}^{3} N_{cells}^{DL,\mu_{ref}}} \right\rfloor \right\},$$

where $N_{cells}^{DL,\mu_{ref}}$ represents a number of serving cells with the reference subcarrier spacing configuration $\mu_{ref}$ which are configured for the UE, $M_{PDCCH}^{max,slot,\mu_{ref}}$ represents a maximum number of PDCCHs of different sizes detected in each slot of each serving cell with the reference subcarrier spacing configuration $\mu_{ref}$, $C_{PDCCH}^{max,slot,\mu_{ref}}$ represents a maximum number of non-overlapping CCEs detected in each slot of each serving cell with the reference subcarrier spacing configuration $\mu_{ref}$, $N_{cells}^{cap}$ represents a number of serving cells for which the PDCCHs can be detected by the UE, which is indicated by a parameter, $N_{cells}^{DL,\mu_{ref}}$ represents a number of serving cells with the reference subcarrier spacing configuration $\mu_{ref}$ which are configured for the UE, and $\lfloor \ldots \rfloor$ represents a flooring operation;

calculating a maximum number of PDCCH detections of each serving cell for the UE according to the sum $M_{PDCCH}^{total,slot,\mu_{ref}}$ of the maximum numbers of detections of PDCCHs, and calculating a maximum number of detections of CCEs of each serving cell for the UE according to the sum $C_{PDCCH}^{total,slot,\mu_{ref}}$ of the maximum numbers of detections of CCEs; and For example, it may be calculated as follows:

the maximum number of PDCCH detections of each of $(M_{PDCCH}^{total,slot,\mu_{ref}})\mod(N_{cells}^{DL,\mu_{ref}})$ serving cells is $M_{PDCCH}^{\mu_{ref}}=\lfloor M_{PDCCH}^{total,slot,\mu_{ref}}/N_{cells}^{DL,\mu_{ref}}\rfloor+1$, while the maximum number of PDCCH detections of each of $N_{cells}^{DL,\mu_{ref}}-(M_{PDCCH}^{total,slot,\mu_{ref}})\mod(N_{cells}^{DL,\mu_{ref}})$ serving cell is $M_{PDCCH}^{\mu_{ref}}=\lfloor M_{PDCCH}^{total,slot,\mu_{ref}}/N_{cells}^{DL,\mu_{ref}}\rfloor$;

the maximum number of CCE detections of each of $(C_{PDCCH}^{total,slot,\mu_{ref}})\mod(N_{cells}^{DL,\mu_{ref}})$ serving cells is $C_{PDCCH}^{\mu_{ref}}=\lfloor C_{PDCCH}^{total,slot,\mu_{ref}}/N_{cells}^{DL,\mu_{ref}}\rfloor+1$, while the maximum number of CCE detections of each of $N_{cells}^{DL,\mu_{ref}}-(C_{PDCCH}^{total,slot,\mu_{ref}})\mod(N_{cells}^{DL,\mu_{ref}})$ serving cell is $C_{PDCCH}^{\mu_{ref}}=\lfloor C_{PDCCH}^{total,slot,\mu_{ref}}/N_{cells}^{DL,\mu_{ref}}\rfloor$.

The at least one serving cell with which the plurality of downlink BWPs are configured and whose sub-carrier spacing configurations of the configured downlink BWPs are not exactly identical, when the reference subcarrier spacing configuration $\mu_{ref}$ is the same as the subcarrier spacing configuration of the active downlink BWP of the serving cell, the maximum number of PDCCH detections of the serving cell and the maximum number of CCE detections of the serving cell are calculated by the above method. When the reference subcarrier spacing configuration $\mu_{ref}$ is different from the subcarrier spacing configuration of the active downlink BWP of the serving cell, the maximum number of PDCCH detections of the serving cell is $$M_{PDCCH}^{\mu_{active}} = \left\lfloor \frac{M_{PDCCH}^{\mu_{ref}}}{M_{PDCCH}^{max,slot,\mu_{ref}}} * M_{PDCCH}^{max,slot,\mu_{active}} \right\rfloor,$$

and the maximum number of CCE detections of the serving cell is $$C_{PDCCH}^{\mu_{active}} = \left\lfloor \frac{C_{PDCCH}^{\mu_{ref}}}{C_{PDCCH}^{max,slot,\mu_{ref}}} * C_{PDCCH}^{max,slot,\mu_{active}} \right\rfloor,$$

where $\mu_{active}$ is the subcarrier spacing configuration of the active downlink BWP of the serving cell.

It should be understood that the above calculations are only illustrative but not limiting, and the disclosure is not limited thereto.

Next, the number of PDCCH detections of each serving cell for the UE may be determined by considering both the calculated maximum number of PDCCH detections and maximum number of detections of CCEs of each serving cell for the UE.

In an exemplary embodiment, the largest or the smallest one of the subcarrier spacing configurations of the plurality of downlink BWPs configured in the serving cell configured with the plurality of downlink BWPs is used as the reference subcarrier spacing configuration $\mu_{ref}$.

If the UE is configured with CA or DC, a CA or DC capability of the UE supports up to a predetermined number of serving cells, and the UE is configured with the predetermined number of serving cells or less, wherein subcarrier spacing configurations of the plurality of downlink BWPs with which the at least one serving cell is configured are not exactly identical, said determining the number of PDCCH detections of each serving cell for the UE comprises:

determining a maximum number of detections of PDCCHs of different sizes $M_{PDCCH}^{max,slot,\mu}$ and a maximum number of detections of non-overlapping CCEs $C_{PDCCH}^{max,slot,\mu}$ of the UE in each slot in the active downlink BWP of each serving cell with a subcarrier spacing configuration $\mu$ respectively, according to a predetermined correspondence between the subcarrier spacing configuration $\mu$ of each serving cell and a maximum number of PDCCHs of different sizes $M_{PDCCH}^{max,slot,\mu}$ detected in each slot of each serving cell, and a maximum number of non-overlapping CCEs $C_{PDCCH}^{max,slot,\mu}$ detected in each slot of each serving cell; and determining the number of PDCCH detections of each serving cell for the UE by considering both the maximum number of detections of PDCCHs $M_{PDCCH}^{max,slot,\mu}$ and the maximum number of detections of CCEs $C_{PDCCH}^{max,slot,\mu}$.

In order to save the power of the UE, a Discontinuous Reception (DRX) technology is introduced. That is, when the UE has no traffic, the UE does not continuously detect the PDCCH, but detects the PDCCH only for a period of time in one duration. This duration is called a DRX duration. The first part of the duration is called drx-onDurationTimer, during which the UE needs to detect the PDCCH. This period of time is called Active Time of UE. The UE does not detect the PDCCH in the remaining time in the duration, if there is no other indication, as shown in FIG. 15. In this way, the UE does not need to keep detecting the PDCCH, thereby saving power, and the periodical detection facilitate to transmit traffic timely if there is traffic to be transmitted.

If the UE detects the PDCCH and the PDCCH indicates a new uplink or downlink transmission (that is, the PDCCH schedules a newly transmitted PUSCH or PDSCH), the UE starts or restarts a drx-InactivityTimer. Before the timer expires, the UE is in the active time, and during the period of drx-InactivityTimer, the UE needs to detect the PDCCH, so that the UE may continuously receive or transmit traffic, as shown in FIG. 16. In addition, in the three timers, drx-RetransmissionTimerDL, drx-RetransmissionTimerUL, and ra-ContentionResolutionTimer, which are introduced due to the retransmission requirement and the random access requirement, the UE is also in the active time, and also needs to detect the PDCCH.

In this way, if the UE is configured with DRX, the UE is in the active time and needs to detect the PDCCH for the time of the five timers as described above, namely, drx-onDurationTimer, drx-InactivityTimer, drx-RetransmissionTimerDL, drx-RetransmissionTimerUL and ra-ContentionResolutionTimer. The four timers of drx-InactivityTimer, drx-RetransmissionTimerDL, drx-RetransmissionTimerUL and ra-ContentionResolutionTimer in the five timers are driven by data transmission or reception, and the timer of drx-onDurationTimer in these five timers is not driven by data transmission or reception, but periodically detects whether there is data to be transmitted.

At present, due to the increase of the bandwidth of the carrier frequency, the UE needs to detect the PDCCH in the entire bandwidth, which consumes more power; there are more formats for the UE to detect the PDCCH, which also consumes more power; and there are more time instants for the UE to detect the PDCCH, which also consumes more power. Therefore, power saving is an urgent problem to be solved for the UE. One method is that gNB configures a plurality of sets of PDCCH detection modes. Bandwidths detected by different PDCCH detection modes may be different, PDCCH formats detected by different PDCCH detection modes may be different, time instants for detecting the PDCCH by different PDCCH detection modes may detect different. Different PDCCH detection modes have different power saving levels. Different PDCCH detection modes are used in active times within different timers to achieve different data transmission requirements and different UE power saving levels. For example, during the drx-onDurationTimer, the UE uses the first set of PDCCH detection mode, the UE working in this set of PDCCH detection mode may be relatively power saving. During the drx-inactivityTimer, the UE uses the second set of PDCCH detection mode, the UE working in this set of PDCCH detection mode may transmit a large amount of data, but does not save power. The advantage of the second set of PDCCH detection mode is that the UE can save power when the UE does not transmit data; while the UE may transmit a large amount of data when the UE needs to transmit the large amount of data. Which particular PDCCH detection mode under which timer the UE uses may be obtained by the UE receiving the higher layer signaling configuration transmitted from gNB. In addition, when the drxInactivityTimer is started after the PDCCH for scheduling the newly transmitted PDSCH is detected, the UE may start detecting all formats of PDCCHs for scheduling PDSCHs (for example, DCI format 1_0, DCI format 1_1) and a part of formats of PDCCHs for scheduling PUSCHs (for example, this part of formats of PDCCHs for scheduling PUSCHs and the formats of the PDCCHs for scheduling the PDSCHs have the same number of bits, e.g., DCI format 0_0). This would not increase the number of PDCCH detections due to the increase of the number of formats of the PDCCHs for scheduling the PDSCHs. Similarly, when the drx-InactivityTimer is started after the PDCCH for scheduling the newly transmitted PUSCH is detected, the UE may start detecting all formats of PDCCHs for scheduling PUSCHs (for example, DCI format 0_0, DCI format 0_1) and a part of formats of PDCCHs for scheduling PDSCHs (for example, this part of formats of PDCCHs for scheduling PDSCHs and the formats of the PDCCHs for scheduling the PUSCHs have the same number of bits, e.g., DCI format 0_0). This would not increase the number of PDCCH detections due to the increase of the number of formats of the PDCCHs for scheduling the PUSCHs.

For example, as shown in Table 4, each timer type is configured with a PDCCH detection mode, different timers may be configured with the same PDCCH detection mode, and different timers may also be configured with different PDCCH detection modes. Table 4 shows a mapping table of timer type and PDCCH detection mode in each timer time.

TABLE 4

| Timer Type | PDCCH Detection Mode |
| --- | --- |
| drx-onDurationTimer | First set of configured PDCCH Detection Mode |

TABLE 4-continued

| Timer Type | PDCCH Detection Mode |
|---|---|
| drx-InactivityTimer | Second set of configured PDCCH Detection Mode |
| drx-RetransmissionTimerDL | Third set of configured PDCCH Detection Mode |
| drx-RetransmissionTimerUL | Fourth set of configured PDCCH Detection Mode |
| ra-ContentionResolutionTimer | Fifth set of configured PDCCH Detection Mode |

PDCCH detection parameters of each PDCCH detection mode may be obtained by the U receiving the higher layer signaling configuration transmitted by the gNB. The PDCCH detection parameters described herein may include a bandwidth of PDCCH detection, a format of PDCCH detection, and the like. For example, as shown in Table 5, each PDCCH detection mode is configured with a set of PDCCH detection parameters, different PDCCH detection modes may be configured with the same PDCCH detection parameters, and different PDCCH detection modes may also be configured with different PDCCH detection parameters. Table 5 shows mapping table of PDCCH detection parameter and PDCCH detection mode in each timer time.

TABLE 5

| PDCCH Detection Mode | PDCCH Detection Parameter |
|---|---|
| First set of configured PDCCH Detection Mode | First set of configured PDCCH Detection Parameters |
| Second set of configured PDCCH Detection Mode | Second set of configured PDCCH Detection Parameters |
| Third set of configured PDCCH Detection Mode | Third set of configured PDCCH Detection Parameters |
| Fourth set of configured PDCCH Detection Mode | Fourth set of configured PDCCH Detection Parameters |
| Fifth set of configured PDCCH Detection Mode | Fifth set of configured PDCCH Detection Parameters |

In addition, the DRX duration has a short DRX duration and a long DRX duration. drx-onDurationTimer in the long DRX duration and drx-onDurationTimer in the short DRX duration may also be configured with different PDCCH detection modes. For example, the UE does not detect the PDCCH but detects the wake-up reference signal in drx-onDurationTimer of the long DRX duration, and starts detecting the PDCCH again after detecting the wake-up reference signal. The UE is in PDCCH Detection Mode 1 in drx-onDurationTimer of the short DRX duration. The same PDCCH detection mode may also be configured for the drx-onDurationTimer in the long DRX duration and the drx-onDurationTimer in the short DRX duration.

Alternatively, in order to save more power, in the time drx-onDurationTimer, if there is no other indication, the UE does not detect the PDCCH, but only detects the wake-up reference signal. If the wake-up reference signal is detected, the UE starts the PDCCH detection. After detecting the wake-up reference signal, the UE starts the PDCCH detection using PDCCH Detection Mode 1. If the PDCCH is detected again, the PDCCH detection is performed using PDCCH Detection Mode 2, so that the power consumption of the UE due to the erroneous detection of the wake-up reference signal may be avoided. The PDCCH detection parameters of PDCCH Detection Mode 1 and PDCCH Detection Mode 2 may be configured by the higher layer signaling to the UE.

During drx-onDurationTimer, if there is no other indication, the UE does not detect the PDCCH, but only detects the wake-up reference signal. The wake-up signal may be a Demodulation Reference Signal (DMRS) for demodulating the PDCCH. The UE determines the DMRS format for the wake-up signal by receiving the higher layer signaling configuration or predefined by the protocol. For example, the time-frequency position of the PDCCH corresponding to the DMRS, and the aggregation level of the PDCCH detection are obtained by the higher layer signaling configuration. When the UE detects the wake-up signal, the UE detects the PDCCH for which the wake-up signal is used as the DMRS. If the UE detects the PDCCH, the UE starts detection of other PDCCHs.

The program running on the device according to the present invention may be a program that causes a computer to implement the functions of the embodiments of the present invention by controlling a central processing unit (CPU). The program or information processed by the program may be temporarily stored in a volatile memory (such as a random access memory RAM), a hard disk drive (HDD), a non-volatile memory (such as a flash memory), or other memory system.

A program for realizing the functions of the embodiments of the present invention can be recorded on a computer readable recording medium. The corresponding functions can be realized by causing a computer system to read programs recorded on the recording medium and execute the programs. The so-called "computer system" herein may be a computer system embedded in the device, and may include an operating system or hardware (such as a peripheral device). The "computer readable recording medium" may be a semiconductor recording medium, an optical recording medium, a magnetic recording medium, a recording medium of a short-term dynamic storage program, or any other recording medium readable by a computer.

Various features or functional blocks of the apparatus used in the above embodiments may be implemented or executed by circuitry (e.g., monolithic or multi-chip integrated circuits). Circuitry designed to perform the functions described in this specification can include general purpose processors, digital signal processors (DSPs), application specific integrated circuits (ASICs), field programmable gate arrays (FPGAs), or other programmable logic devices, discrete Gate or transistor logic, discrete hardware components, or any combination thereof. A general purpose processor may be a microprocessor or any existing processor, controller, microcontroller, or state machine. The above circuit may be a digital circuit or an analog circuit. One or more embodiments of the present invention may also be implemented using these new integrated circuit technologies in a case where existing integrated circuits are replaced with new integrated circuit technologies due to advances in semiconductor technology.

The embodiments of the present invention have been described in detail with reference to the accompanying drawings. However, the specific structure is not limited to the above embodiments, and the present invention also includes any design modifications not departing from the gist of the present invention. In addition, various modifications may be made to the invention within the scope of the claims, and the embodiments obtained by appropriately combining the technical means disclosed in the different embodiments are also included in the technical scope of the present invention. Further, the components having the same effects described in the above embodiments may be substituted for each other.

The above description is only a preferred embodiment of the present application and a description of the principles of the applied technology. It should be understood by those skilled in the art that the scope of the invention referred to in the present application is not limited to the specific combination of the above technical features, and should also be covered by the above technical features without departing from the inventive concept. Other technical solutions formed by any combination of their equivalent features. For example, the above features are combined with the technical features disclosed in the present application, but are not limited to the technical features having similar functions.

The invention claimed is:

1. A method performed by a user equipment (UE) in a wireless communication system, the method comprising:
   determining a reference subcarrier spacing configuration among a plurality subcarrier spacing configurations;
   identifying a number of serving cells with the reference subcarrier spacing configuration;
   identifying a number of serving cells for which physical downlink control channels (PDCCHs) can be detected by the UE;
   identifying a maximum number of PDCCHs of different sizes detected in each slot of each serving cell with the reference subcarrier spacing configuration;
   identifying a maximum number of non-overlapping CCEs detected in each slot of each serving cell with the reference subcarrier spacing configuration;
   determining a sum of respective maximum number of detections of PDCCHs of the UE in each slot of the number of serving cells with the reference subcarrier spacing configuration;
   determining a sum of respective maximum numbers of detections of non-overlapping CCEs in each slot of the number of serving cells with the reference subcarrier spacing configuration; and
   monitoring at least one PDCCH based on the sum of respective maximum number of detections of PDCCHs and the sum of respective maximum numbers of detections of non-overlapping CCEs.

2. The method of claim 1,
   wherein the reference subcarrier spacing configuration is for a first serving cell among a plurality of a second serving cells, and
   wherein the reference subcarrier spacing configuration is not identical to a subcarrier spacing configuration of the second serving cell.

3. The method of claim 2,
   wherein the reference subcarrier spacing configuration is for an active BWP on a first serving cell among a plurality of a second serving cells, and
   wherein the reference subcarrier spacing configuration is not identical to a subcarrier spacing configuration of an active BWP of the second serving cell.

4. The method of claim 2, wherein the UE is configured with carrier aggregation (CA) or dual connectivity (DC), a CA or DC capability of the UE supports a plurality of serving cells or a plurality of BWPs.

5. A user equipment (UE) in a wireless communication system, the UE comprising:
   a transceiver; and
   at least one processor coupled to the transceiver and configured to:
      determine a reference subcarrier spacing configuration among a plurality subcarrier spacing configurations,
      identify a number of serving cells with the reference subcarrier spacing configuration,
      identify a number of serving cells for which physical downlink control channels (PDCCHs) can be detected by the UE,
      identify a maximum number of PDCCHs of different sizes detected in each slot of each serving cell with the reference subcarrier spacing configuration,
      identify a maximum number of non-overlapping CCEs detected in each slot of each serving cell with the reference subcarrier spacing configuration,
      determine a sum of respective maximum number of detections of PDCCHs of the UE in each slot of the number of serving cells with the reference subcarrier spacing configuration,
      determine a sum of respective maximum numbers of detections of non-overlapping CCEs in each slot of the number of serving cells with the reference subcarrier spacing configuration, and
      monitor at least one PDCCH based on the sum of respective maximum number of detections of PDCCHs and the sum of respective maximum numbers of detections of non-overlapping CCEs.

6. The UE of claim 5,
   wherein the reference subcarrier spacing configuration is for a first serving cell among a plurality of a second serving cells, and
   the reference subcarrier spacing configuration is not identical to a subcarrier spacing configuration of the second serving cell.

7. The UE of claim 5,
   wherein the reference subcarrier spacing configuration is for an active BWP on a first serving cell among a plurality of a second serving cells, and
   the reference subcarrier spacing configuration is not identical to a subcarrier spacing configuration of an active BWP of the second serving cell.

8. The UE of claim 5, wherein the UE is configured with carrier aggregation (CA) or dual connectivity (DC), a CA or DC capability of the UE supports a plurality of serving cells or a plurality of BWPs.

* * * * *